US012192226B2

(12) United States Patent
Mosko et al.

(10) Patent No.: US 12,192,226 B2
(45) Date of Patent: Jan. 7, 2025

(54) METHOD AND SYSTEM FOR CALCULATING MULTI-DIMENSIONAL METRICS THROUGH A SYSTEM OF DEPENDENCIES

(71) Applicant: Palo Alto Research Center Incorporated, Palo Alto, CA (US)

(72) Inventors: Marc E. Mosko, Kensington, CA (US); Massimiliano Albanese, Potomac, MD (US); Ibifubara Iganibo, Faifax, VA (US)

(73) Assignee: Xerox Corporation, Norwalk, CT (US)

( * ) Notice: Subject to any disclaimer, the term of this patent is extended or adjusted under 35 U.S.C. 154(b) by 241 days.

(21) Appl. No.: 18/071,431

(22) Filed: Nov. 29, 2022

(65) Prior Publication Data

US 2023/0344856 A1    Oct. 26, 2023

Related U.S. Application Data

(60) Provisional application No. 63/334,032, filed on Apr. 22, 2022.

(51) Int. Cl.
*H04L 9/40* (2022.01)
*H04L 41/0816* (2022.01)

(52) U.S. Cl.
CPC ...... *H04L 63/1433* (2013.01); *H04L 41/0816* (2013.01); *H04L 63/1416* (2013.01); *H04L 63/1425* (2013.01); *H04L 63/1466* (2013.01)

(58) Field of Classification Search
CPC ............ H04L 63/1433; H04L 41/0816; H04L 63/1416; H04L 63/1425; H04L 63/1466; H04L 41/0823
See application file for complete search history.

(56) References Cited

U.S. PATENT DOCUMENTS 6,742,128 B1    5/2004  Joiner
7,013,395 B1    3/2006  Swiler
(Continued)

FOREIGN PATENT DOCUMENTS

CN    106991325 A    7/2017
CN    106997437 A    8/2017
(Continued)

OTHER PUBLICATIONS

Albanese, M., & Jajodia, S. (2017). A Graphical Model to Assess the Impact of Multi-Step Attacks. The Journal of Defense Modeling and Simulation. 79-93.
(Continued)

*Primary Examiner* — Huan V Doan
(74) *Attorney, Agent, or Firm* — Shun Yao; Yao Legal Services, Inc.

(57) ABSTRACT

A system determines an on/off feature and vulnerability and dependency nodes in a graph which represents a system of components. The feature enables vulnerability nodes based on a probability that a vulnerability will be exploited, and a vulnerability degrades a utility of one or more components based on an exposure factor. The system calculates, for a path in the graph to a component, a loss of utility of a given dimension of multiple dimensions based on a combiner operator and a logic operator. The combiner operator takes inputs which represent a weighted probability that the given dimension is degraded, and the logic operator defines the inputs based on a probability and exposure factor. The system aggregates calculated losses of utility across the multiple dimensions for the system components. The system selects a combination of possible on/off feature values which results in a lowest loss of utility for the components.

20 Claims, 19 Drawing Sheets

(56) References Cited

U.S. PATENT DOCUMENTS

| | | |
|---|---|---|
| 7,627,900 B1 | 12/2009 | Noel |
| 9,215,158 B1 | 12/2015 | Adogla |
| 9,317,692 B2 | 4/2016 | Elder |
| 9,684,865 B1 | 6/2017 | Ezick |
| 9,705,978 B1 | 7/2017 | Kenigsberg |
| 9,736,173 B2 | 8/2017 | Li |
| 10,313,382 B2 | 6/2019 | Noel |
| RE47,757 E | 12/2019 | Hering |
| 10,516,761 B1 | 12/2019 | A |
| 10,601,854 B2 | 3/2020 | Lokamathe |
| 10,771,489 B1 | 9/2020 | Bisht |
| 10,812,499 B2 | 10/2020 | Hassanzadeh |
| 10,904,270 B2 | 1/2021 | Muddu |
| 11,265,292 B1 | 3/2022 | Leviseur |
| 2006/0265324 A1 | 11/2006 | Leclerc |
| 2007/0011319 A1 | 1/2007 | Mcclure |
| 2008/0098479 A1 | 4/2008 | O'Rourke |
| 2008/0104665 A1 | 5/2008 | Naldurg |
| 2008/0172716 A1 | 7/2008 | Talpade |
| 2009/0077666 A1 | 3/2009 | Chen |
| 2009/0265199 A1 | 10/2009 | Moerdler |
| 2010/0095381 A1 | 4/2010 | Levi |
| 2010/0192195 A1 | 7/2010 | Dunagan |
| 2013/0232331 A1 | 9/2013 | Farhan |
| 2013/0247205 A1 | 9/2013 | Schrecker |
| 2015/0058993 A1 | 2/2015 | Choi |
| 2015/0244734 A1 | 8/2015 | Olson |
| 2016/0050116 A1 | 2/2016 | Sheshadri |
| 2016/0205122 A1 | 7/2016 | Bassett |
| 2017/0034023 A1 | 2/2017 | Nickolov |
| 2017/0078320 A1 | 3/2017 | Hughes |
| 2017/0177740 A1 | 6/2017 | Abaya |
| 2017/0195349 A1 | 7/2017 | Shabtai |
| 2017/0286690 A1 | 10/2017 | Chari |
| 2017/0289187 A1 | 10/2017 | Noel |
| 2017/0324768 A1 | 11/2017 | Crabtree |
| 2018/0210927 A1 | 7/2018 | Karam |
| 2018/0322407 A1 | 11/2018 | Baum |
| 2019/0098039 A1 | 3/2019 | Gates |
| 2020/0053116 A1 | 2/2020 | Soroush |
| 2020/0110774 A1 | 4/2020 | Lakshmanan |
| 2020/0137104 A1 | 4/2020 | Hassanzadeh |
| 2020/0167705 A1 | 5/2020 | Risoldi |
| 2020/0175174 A1 | 6/2020 | Bakalli |
| 2020/0177608 A1 | 6/2020 | Okunlola |
| 2020/0177615 A1 | 6/2020 | Grabois |
| 2020/0177617 A1 | 6/2020 | Hadar |
| 2020/0177618 A1 | 6/2020 | Hassanzadeh |
| 2020/0244691 A1 | 7/2020 | Veeramany |
| 2020/0311630 A1 | 10/2020 | Risoldi |
| 2020/0412758 A1 | 12/2020 | Trivellato |
| 2021/0012012 A1 | 1/2021 | Soroush |
| 2021/0014065 A1 | 1/2021 | Gourisetti |
| 2021/0014264 A1 | 1/2021 | Soroush |
| 2021/0014265 A1 | 1/2021 | Hadar |
| 2021/0409439 A1 | 12/2021 | Engelberg |
| 2022/0014534 A1* | 1/2022 | Basovskiy .......... H04L 63/1433 |
| 2022/0191230 A1* | 6/2022 | Morgan ................ H04L 63/20 |
| 2022/0263860 A1 | 8/2022 | Crabtree |

FOREIGN PATENT DOCUMENTS

| | | |
|---|---|---|
| CN | 107038380 A | 8/2017 |
| CN | 107066256 A | 8/2017 |
| CN | 108123962 A | 6/2018 |
| CN | 110138788 A | 8/2019 |
| CN | 110188871 A | 8/2019 |
| CN | 110191120 A | 8/2019 |
| CN | 111611586 A | 9/2020 |
| CN | 112766374 A | 5/2021 |
| KR | 102079970 B1 | 4/2020 |
| WO | 0070463 A1 | 11/2000 |
| WO | 2007143226 A2 | 12/2007 |
| WO | 2019186722 A1 | 10/2019 |

OTHER PUBLICATIONS

Albanese, M., Pugliese, A., & Subrahmanian, V. (2013). Fast Activity Detection: Indexing for Temporal Stochastic Automaton-Based Activity Models. IEEE Transactions on Knowledge and Data Engineering, 360-373.

Bahl, P., Barham, P., & Black, R. (2006). Discovering Dependencies for Network Management. ACM HotNets.

BeyondTrust. (2018). Retina. Retrieved from Retina: https://www.beyondtrust.com/products/retina-network-security-scanner/.

CyVision. (2018). CyVision. Retrieved from CyVision: https://www.cyvisiontechnologies.com/.

GraphX. (2018). GraphX. Retrieved from GraphX: https://spark.apache.org/graphx/.

Leversage, D., & Byres, E. (2008). Estimating a system's mean time-to-compromise. IEEE Security & Privacy, 52-60.

Mitre. (2018). CVE. Retrieved from CVE: https://cve.mitre.org/.

MSR. (2018). Z3 Guide. Retrieved from Z3 Guide: https://rise4fun.com/z3/tutorialcontent/guide#h23.

Natarajan, A., Ning, P., Liu, Y., Jajodia, S., & Hutchinson, S. (2012). NSDMiner: Automated Discovery of Network Service Dependencies. IEEE INFOCOM.

NIST. (2018). Retrieved form https://nvd.nist.gov/.

OMG. (Mar. 2015). Data Distribution Service Specification Version 1.4. Retrieved from OMG DDS: https://www.omg.org/spec/DDS/About-DDS/.

RTI. (2017). RTI Routing Service. Retrieved from RTI Routing Service: https://rti.com/products/dds/routing-service.html.

SANS. (2002). SANS Institute, "Quantitative Risk Analysis Step-by-Step". Retrieved from Quantitative Risk Analysis Step-by-Step: https://www.sans.org/reading-room/whitepapers/auditing/quantitative-risk-analysis-step-by-step-849.

Schrecker, S., Soroush, H., & Molina, J. (2016). "Industrial Internet of Things vol. G4: Security Framework",. CreateSpace Independent Publishing Platform.

Soroush, H., Irey, P., & Pardo-Castellote, G. (2015). Next-Generation Cybersecurity for Advanced Real-Time Distributed Systems. Intelligent Ships Symposium.

StackOverflow. (2018). StackOverflow. Retrieved from StackOverflow: https://stackflow.com/.

Tenable. (2018). Nessus. Retrieved from Nessus: https://www.tenable.com/products/nessus/nessus-professional.

Venkatesan, S., Albanese, M., & Jajodia, S. (2015). Distributing Stealthy Botnets through Strategic Placement of Detectors. IEEE Conference on Communications and Network Security (IEEE CNS).

Venkatesan, S., Albanese, M., Cybenko, G., & Jajodia, S. (2016). A Moving Target Defense Approach to Disrupting Stealthy Botnets. ACM Workshop on Moving Target Defense (MTD).

Welsh, M. (2013). What I Wish System Researchers Would Work On. Retrieved from http://matt-welsh.blogspot.com/2013/05/what-i-wish-systems-researchers-would.html.

Xu, Tu., & Zhou, Y. (2015). Systems Approaches to Tackling Configuration Errors: A Survey. ACM Comput. Surv.

Gemini George, A Graph-Based Security Framework for Securing Industrial IoT Networks From Vulnerability Exploitations, IEEE Access (vol. 6, pp. 43586-43601), Jan. 1, 2018, 16 pages (Year: 2018).

Brigitte Boden, Mining Coherent Subgraphs in Multi-Layer Graphs with Edge Labels, Data Management and Data Exploration Group RWTH Aachen University, Germany, Proceedings of the 18th ACM SIGKDD international conference on Knowledge discovery and data mining, Aug. 2012 pp. 1258-1266 (Year: 2012).

Ibifubara Iganibo, Vulnerability Metrics for Graph-based Configuration Security, 2021, Center for Secure Information Systems, George Mason University, Fairfax, U.S.A. ,Palo Alto Research Center, Palo Alto, U.S.A, 12 pages (Year: 2021).

Massimilliano Albanese, A Graphic Model to Assess the Impact of Multi-Step Attacks, Journal of Defense Modeling and Simulation: Applications, Methodology, Technology, 2018, vol. 15(1) 79-93 (Year: 2018) Retrieved from https://journals.sagepub.com/doi/pdf/10.1177/1548512917706043.

(56) References Cited

OTHER PUBLICATIONS

Mridul Sankar Barik, A Graph Data Model for Attack Graph Generation and Analysis, Dept. of Comp. Sc. and Engg., Jadavpur University Kolkata, India {msbarikm, chandanm}@cse.jdvu.ac.In. 2014, 12 pages (Year: 2014).

* cited by examiner

| | 830 INPUT COLUMNS | | 840 OUTPUT COLUMNS | | | |
|---|---|---|---|---|---|---|
| | 832 R$_{Cr0}$ | 834 R$_{Cr1}$ | 842 SLE$_{Cm0}$ | 844 SLE$_{Cm1}$ | 846 SLE$_{Cm2}$ | 848 SLE$_{Cm3}$ |
| 852 | 0 | 0 | [0, 0, 0] | [0, 0, 0] | [0, 0, 0] | [0, 0, 0] |
| 854 | 1 | 0 | [7, 27, 0] | [10, 10, 0] | [0, 0, 0] | [0, 0, 0] |
| 856 | 0 | 1 | [0, 0, 0] | [10, 10, 0] | [0, 0, 27] | [0, 0, 20] |
| 858 | 1 | 1 | [7, 27, 0] | [10, 10, 0] | [0, 0, 27] | [0, 0, 20] |

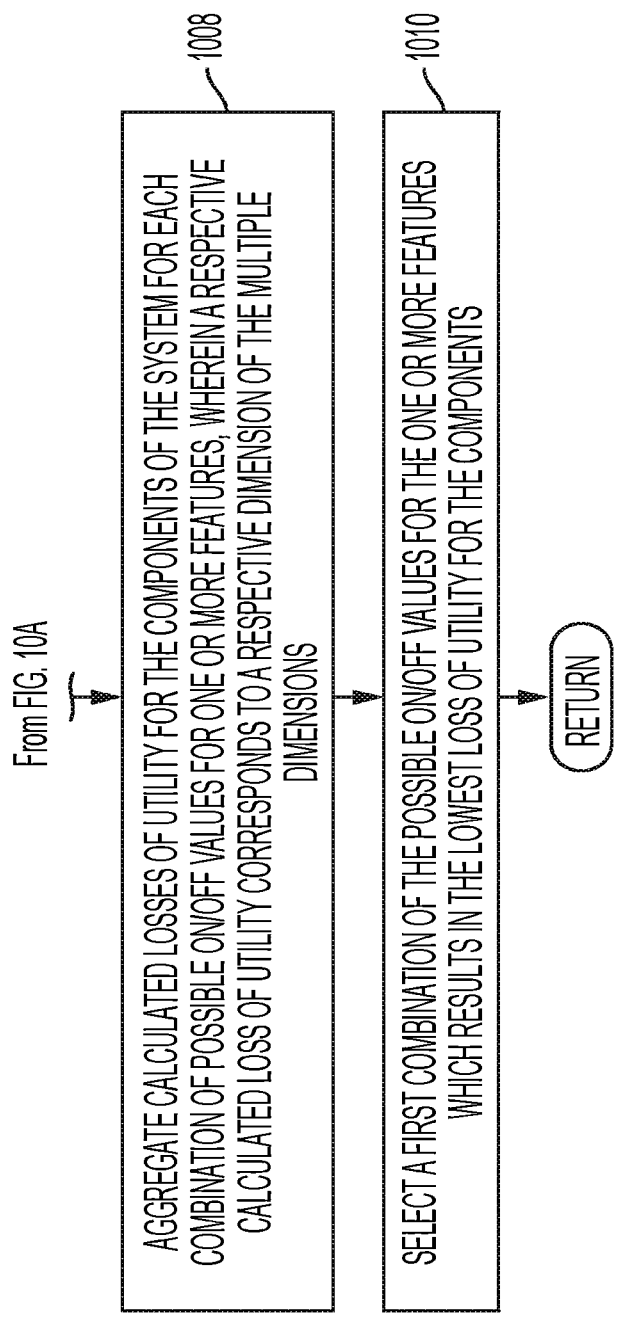

METHOD AND SYSTEM FOR CALCULATING MULTI-DIMENSIONAL METRICS THROUGH A SYSTEM OF DEPENDENCIES

RELATED APPLICATIONS

This application claims the benefit of:

U.S. Provisional Application No. 63/334,032, titled "Method and System for Complex System Ranking Score Using an Attack Volume Metric to Find Optimal Configurations," by inventors Massimiliano Albanese, Ibifubara Iganibo, Marc E. Mosko, and Alejandro E. Brito, filed 22 Apr. 2022, which subject matter is related to the subject matter in U.S. patent application Ser. No. 16/219,774, entitled "Method for Improving the Security of a Networked System by Adjusting the Configuration Parameters of the System Components," by inventors Hamed Soroush and Shantanu Rane, filed 13 Dec. 2018 and issued 1 Jun. 2021 as U.S. Pat. No. 11,025,661 (hereinafter "U.S. Pat. No. 11,025,661"), which application claims the benefit of U.S. Provisional Application No. 62/718,328, titled "Method for Improving the Security of a Networked System by Adjusting the Configuration Parameters of the System Components," by inventors Hamed Soroush and Shantanu Rane, filed 13 Aug. 2018; and is further related to U.S. patent application Ser. No. 16/918,971, entitled "System and Method for Constructing a Graph-Based Model for Optimizing the Security Posture of a Composed Internet of Things System," by inventors Hamed Soroush, Milad Asgari Mehrabadi, Shantanu Rane, and Massimiliano Albanese, filed 1 Jul. 2020 (hereinafter "U.S. patent application Ser. No. 16/918,971");

U.S. patent application Ser. No. 16/923,763, entitled "System and Method for Reasoning About the Optimality of a Configuration Parameter of a Distributed System," by inventors Hamed Soroush and Shantanu Rane, filed 8 Jul. 2020 (hereinafter "U.S. patent application Ser. No. 16/923,763");

U.S. patent application Ser. No. 17/350,221, entitled "System and Method for Determining Vulnerability Metrics for Graph-Based Configuration Security," by inventors Massimiliano Albanese and Marc E. Mosko, filed 17 Jun. 2021 (hereinafter "U.S. patent application Ser. No. 17/350,221"); and U.S. patent application Ser. No. 17/831,848, entitled "Method and System for Facilitating a Ranking Score Using Attack Volume to Find Optimal Configurations," by inventors Massimiliano Albanese, Ibifubara Iganibo, Marc E. Mosko, and Alejandro E. Brito, filed 3 Jun. 2022 (hereinafter "U.S. patent application Ser. No. 17/831,848"), the disclosures of which are herein incorporated by reference in their entirety.

STATEMENT OF GOVERNMENT-FUNDED RESEARCH

This invention was made with U.S. government support under (Contract Number) Award Number: FA8750-18-2-0147 awarded by the Defense Advanced Research Projects Agency (DARPA) of the Department of Defense (DoD). The U.S. government has certain rights in the invention.

BACKGROUND

Field

This disclosure is generally related to improving the security of an interdependent system of components. More specifically, this disclosure is related to a method and system for calculating multi-dimensional metrics through a system of dependencies.

Related Art

As cybersystems become increasingly complex and connected, configuration analytics may play a critical role in the correct and secure operation of cybersystems or composed systems (e.g., a networked Industrial Control System (ICS) or an Internet of Things (IoT) system). Given the significant number of interconnected components in a composed system, providing the appropriate level of security for such networked systems may pose a challenge. For example, a majority of the security compromises in IoT systems can be attributed to misconfigurations, i.e., combinations of configuration parameters of the individual system components that expose vulnerabilities to an adversary. Attackers may rely on unpatched vulnerabilities and configuration errors to gain unauthorized access to system resources. Misconfigurations can occur at any level of a system's software architecture. Thus, correctly configuring systems can become increasingly complex given multiple interconnected systems.

Correctly configuring systems may require understanding the impact of certain choices or constraints related to system exposures or vulnerabilities. Current solutions lack a principled approach to managing the complex relationships between the configuration parameters of the many components of a composed system, and do not leverage the complex and intrinsic relationships between vulnerabilities, components, and system configurations. While some current systems may rate vulnerabilities along multiple dimensions, the challenge remains to use these separate multiple dimensions in an end-to-end system of interconnected components represented by multiple subgraphs.

SUMMARY

One embodiment provides a system which facilitates calculating multi-dimensional metrics through a system of dependencies. During operation, the system determines a feature with one of an on value and an off value. The system determines, in a graph which represents a system of components, vulnerability nodes and dependency nodes. The vulnerability nodes represent known vulnerabilities to the system, wherein the feature enables one or more vulnerability nodes based on a respective probability that a respective vulnerability will be exploited, and the dependency nodes represent the components of the system, wherein a respective vulnerability degrades a utility of one or more components based on an exposure factor, and wherein a respective component depends on zero or more other components based on a weight. The system calculates, for a path in the graph to a first component, a loss of utility of a given dimension of multiple dimensions based on a combiner operator and a logic operator. The combiner operator takes a first set of inputs which represent a weighted probability that the given dimension is degraded, and the logic operator defines the first set of inputs based on at least a respective probability and a respective exposure factor. The system aggregates calculated losses of utility for the components of the system for each combination of possible on/off values for one or more features, wherein a respective calculated loss of utility corresponds to a respective dimension of the multiple dimensions. The system selects a first combination of the possible on/off values for the one or more features which results in a lowest loss of utility for the components.

In variation on this embodiment, the feature comprises a constraint, and the one or more features comprise one or more constraints. The constraint is one of the one or more constraints, and the constraint is related to a limitation on a configurable parameter for a component of the system of the components.

In a further variation, the known vulnerabilities represented by the vulnerability nodes are based on at least one of: common vulnerabilities and exposures (CVE) based on a national vulnerability database (NVD); non-CVE vulnerabilities; and a predefined bad practice or best practice.

In a further variation, a dependency between the respective component and a first component upon which the respective component depends is associated with at least one of: a scaled dependency, in which the respective component degrades in a proportion to how the first component is impacted; a strict dependency, in which the respective component degrades completely based on how the first component is impacted; a redundant dependency, in which the respective component degrades if the first component and other components in a redundant pool of resources are impacted; and a proportional dependency, in which the respective component degrades by a fixed factor if a first component is impacted.

In a further variation, the multiple dimensions include at least one of: a confidentiality dimension; an integrity dimension; and an availability dimension.

In a further variation, the combiner operator determines how the first set of inputs combine to degrade a utility of a given dependency node.

In a further variation, the weighted probability represented by the first set of inputs comprises: for a direct vulnerability in the path, the respective probability and the respective exposure factor; and for an indirect vulnerability or a direct dependency in the path, the respective probability, the respective exposure factor, and results of a combiner operator for a prior dependency in the path.

In a further variation, the logic operator determines how a second set of inputs affect the respective exposure factor of a given vulnerability node. The second set of inputs comprises a result of the logic operator on one or more respective probabilities.

In a further variation, the system applies an updated configuration for the system based on the calculated loss of utility for the first component or the aggregated calculated losses of utility for the components of the system, wherein the updated configuration is based on the selected first combination of possible on/off values.

In a further variation, the graph comprises a multi-layer graph which includes a configuration subgraph, a vulnerability subgraph, and a dependency subgraph. The vulnerability subgraph includes the vulnerability nodes, and the dependency subgraph includes the dependency nodes.

In a further variation, the system displays, on a screen of a user device, one or more interactive elements which allow the user to: view the multi-layer graph, including the vulnerability nodes, the dependency nodes, directed edges, likelihoods of exploitation associated with vulnerability nodes, exposure factors, weights, and dependency functions in any of the configuration subgraph, the vulnerability subgraph, and the dependency subgraph; view or modify configuration parameters for the system using a graph generation tool to obtain the one or more configurations; obtain a calculated loss of utility for any component represented in the multi-layer graph, including across the multiple dimensions; view the calculated loss for the one or more configurations; select a first configuration of the one or more configurations; and view an explanation of evidence associated with the selected first configuration

BRIEF DESCRIPTION OF THE FIGURES

FIG. 8B illustrates values of inputs and resulting outputs of the operator representation depicted in FIG. 7, in accordance with an embodiment of the present application.

FIG. 10A and FIG. 10B present a flowchart illustrating a method for calculating multi-dimensional metrics through a system of dependencies, in accordance with an embodiment of the present application.

In the figures, like reference numerals refer to the same FIG. elements.

DETAILED DESCRIPTION

Figure 1:
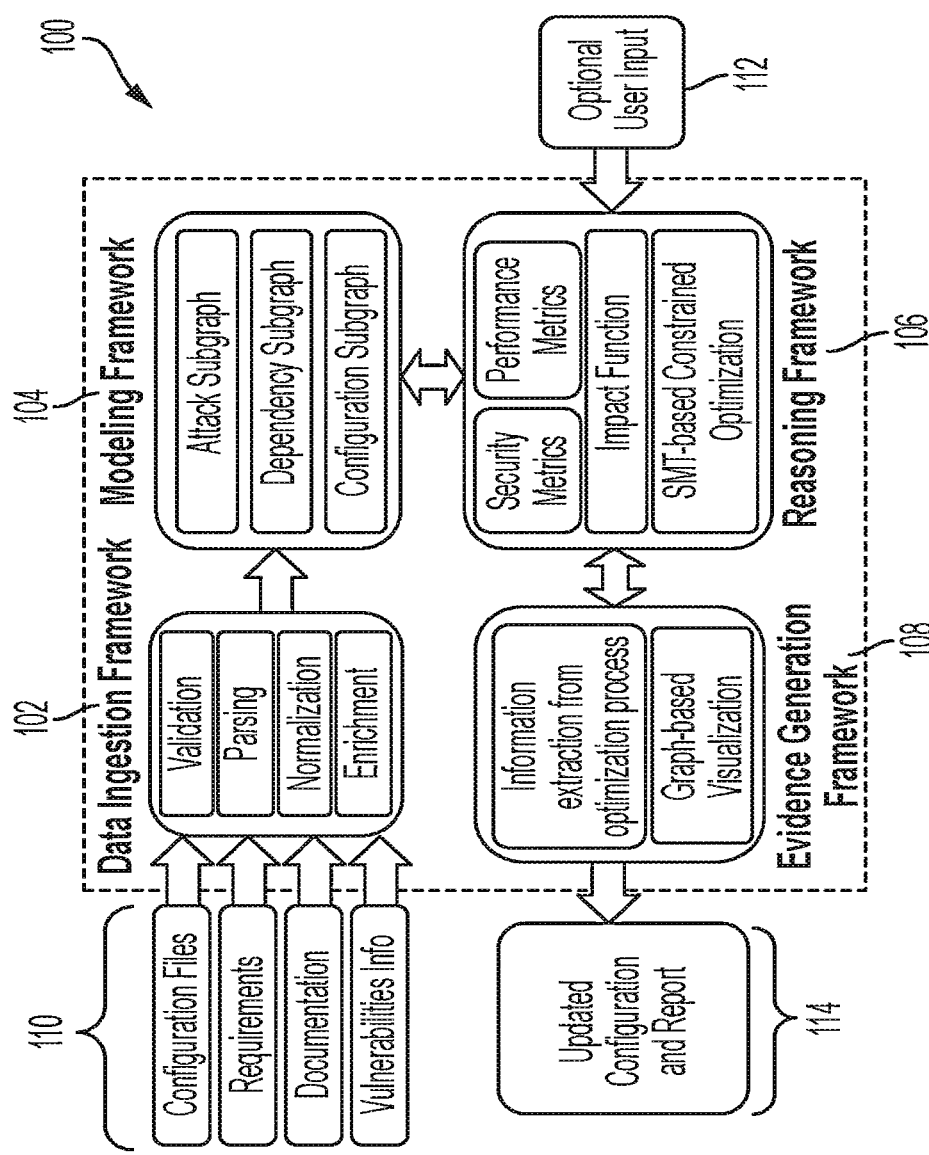
FIG. 1 illustrates an exemplary environment for facilitating an improvement in the security versus functionality tradeoff of a composed system, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Introduction and Overview

The embodiments described herein provide a system and method for calculating multi-dimensional metrics in an end-to-end system of interconnected components (i.e., an "overall system"). The system uses a vector of the multi-dimensions (e.g., confidentiality, integrity, and availability) to represent the impact of a vulnerability. The system also uses a math operator approach to structure the problem description and further uses two security operators to determine how to trigger vulnerabilities and how to combine multiple degrading factors to a system component.

U.S. Pat. No. 11,025,661 describes a larger or "overall system" which can be referred to as secure configurations for the IoT based on optimization and reasoning on graphs (or "SCIBORG"). The overall system can include the following four frameworks: (1) a data ingestion framework; (2) a modeling framework; (3) a reasoning framework; and (4) an evidence generation framework, as summarized below in relation to FIG. 1.

U.S. Pat. No. 11,025,661 also describes how the overall system can model a composed system by constructing a multi-layer graph for a system with a plurality of components. The multi-layer graph can include: a dependency subgraph that captures the functional relationships among system components; a configuration subgraph that accounts for relationships among configuration parameters within and across components; and an attack or vulnerability subgraph modeling the vulnerabilities of the system and the user of those vulnerabilities in multi-step attacks. An exemplary multi-layer graph, including three subgraphs and their constituent components and directed edges, is described below in relation to FIGS. 2B, 2C, and 3A.

As described above, current solutions which work on minimizing the attack surface of a system do not capture the intricate relationships between configuration parameters, attack paths available to an adversary, and functional dependencies among system components. Thus, current solutions generally fail to reduce the risk associated with residual vulnerabilities. The overall system addresses these issues by characterizing the potential impact of multi-step attacks enabled by configuration settings.

The overall system also uses algorithms and software tools to jointly analyze the subgraphs of the multi-layer graph in order to reason about the impact of a candidate configuration set on the security and functionality of the composed system, e.g., by using a Satisfiability Modulo Theory (SMT) solver to express the complex relationships among the configuration parameters as constraints in a security optimization problem, as described in U.S. patent application Ser. No. 16/923,763.

The overall system can be implemented with a scalable pipeline, which can: ingest system requirements, configuration files, software documentation and various types of configuration vulnerabilities (data ingestion framework); based on the data ingested in the data ingestion framework, build a queryable, graph-based representation of the relationships between configuration vulnerabilities and attack scenarios, configuration parameters, and system components (modeling framework); provide an application programming interface (API) to perform a quantitative, comparative analysis of the security impact of configuration settings (reasoning framework); automatically construct a constraint satisfaction problem based on the model and utilize a Z3 SMT solver to solve for optimal parameter values (reasoning framework); and provide human-readable evidence about the optimality of the selected configuration (evidence generation framework).

U.S. patent application Ser. No. 17/831,848 describes various metrics to calculate the traditional "attack surface" of a distributed system of networked components by considering not only the traditional attack surface (e.g., "exposed vulnerabilities" at a perimeter of the system from where an attacker may attempt to enter the system), but also the interdependencies between various elements of the system, such as components, vulnerabilities, and configuration parameters.

As described above, correctly configuring systems may require understanding the impact of certain choices or constraints related to system exposures or vulnerabilities. Current solutions lack a principled approach to managing the complex relationships between the configuration parameters of the many components of a composed system, and do not leverage the complex and intrinsic relationships between vulnerabilities, components, and system configurations. While some current systems may rate vulnerabilities along multiple dimensions or use an average or other combination of impact scores, the challenge remains to use these separate multiple dimensions in an end-to-end system of interconnected components represented by multiple subgraphs.

The described embodiments address this challenge by providing a system which can calculate the impact of each dimension of multiple dimensions or metrics across the overall system, where the impact is a resulting calculated loss of utility for a given component. The loss for the given component can be calculated based on a path through a graph which represents the interconnected relationships between the constraints, vulnerabilities, dependencies, and components of the overall system. The system can calculate the loss by using a math operator approach, including a Combiner operator and a Logic operator. An exemplary single path through the nodes of the graph which results in the calculated loss of utility of a given component, including the use of the Combiner operator and the Logic operator, is described below in relation to FIG. 5A, while relationships between nodes in the graph are described below in relation to FIG. 5B. An exemplary graph model and a corresponding operator model are described below in relation to FIGS. 6, 7, 8A, and 8B.

At a high-level, in the overall system as represented by multiple subgraphs (as described below in relation to FIGS.

2B, 2C, and 3A, a vulnerability must be enabled by one or more constraints or vulnerabilities. A security constraint must enable one or more vulnerabilities. A vulnerability may enable zero or more other vulnerabilities. A vulnerability must degrade one or more components. A component may depend on zero or more other components, and similarly, a component may be the dependent of zero or more other components. This composition of relationships between entities in the overall system graph is described below in relation to FIG. 5B.

Thus, the described embodiments provide a system which defines a system of interconnected components as a graph and calculates the impact of multiple dimensions across the system to obtain a utility loss of the system components. The system obtains the utility loss by using a specific math operator approach, which accounts for the dependencies between constraints, vulnerabilities, and components of the system.

The terms "overall system" or "system" refers to SCI-BORG, which includes the four frameworks (i.e., data ingestion framework, modeling framework, reasoning framework, and evidence generation framework). The term "system" can refer to the overall system as described in U.S. Pat. No. 11,025,661 and to the embodiments of the system as described herein.

The terms "vulnerability graph" and "attack graph" are used interchangeably in this disclosure and refer to one of the three subgraphs of the generated multi-layer graph.

The terms "graph" and "subgraph" are used interchangeably in this disclosure to describe the three graphs or subgraphs which make up the multi-layer graph of the described embodiments, i.e.: the configuration graph or subgraph; the vulnerability graph or subgraph; and the dependency graph or subgraph.

The terms "node" and "vertex" are used interchangeably in this disclosure and refer to a point, unit, or object in a graph or subgraph.

The vulnerability subgraph may include "vulnerability nodes" which represent known vulnerabilities to the system. In this disclosure, the terms "vulnerability node" and "vulnerability" may be used interchangeably.

The dependency subgraph may include "dependency nodes" which represent components in the system. Dependency nodes can include: "direct dependency" nodes which represent "direct components" which are each connected by a directed edge from a vulnerability; and "indirect dependency nodes" which represent "indirect components" which are not connected by a directed edge from a vulnerability but depend upon a direct component, which dependency can be indicated as a directed edge from an indirect dependency node to a direct dependency node. That is, a direct dependency node is degraded directly by a vulnerability, which relationship can be referred to as a "direct vulnerability." An indirect dependency node is degraded by a dependency upon another component and is degraded indirectly by a vulnerability, which relationship can be referred to as an "indirect vulnerability." In this disclosure, the terms "dependency node" and "dependency" and "component" may be used interchangeably.

High-Level Overview of System with Four Frameworks

FIG. 1 illustrates an exemplary environment 100 for facilitating an improvement in the security versus functionality tradeoff of a composed system, in accordance with an embodiment of the present application. Environment 100 can depict or indicate the overall system or SCIBORG. The overall system can include a data ingestion framework 102, a modeling framework 104, a reasoning framework 106, and an evidence generation framework 108. Data ingestion framework 102 can determine information sources associated with software, hardware, middleware, and networking components of a system, and can further receive data from those information sources as input (e.g., input 110 which can include configuration files, functional requirements, documentation, and vulnerabilities information).

Modeling framework 104 can take as input information obtained, ingested, and extracted by data ingestion framework 102, and can produce as output three subgraphs which comprise the multi-layer graph described herein: an attack subgraph 122; a dependency subgraph 124; and a configuration subgraph 126. A detailed flow of the operations performed by modeling framework 104 is described below in relation to FIGS. 2B, 3, 5, 6A, and 6B. Reasoning framework 106 can use the constructed multi-layer graph output by modeling framework 104, and reasoning framework 106 can also receive an optional user input 112. Evidence generation framework 108 can use as input the output of reasoning framework 106, and evidence generation framework 108 can produce as output an updated configuration and report 114.

Exemplary Network Diagram and Corresponding Multi-Layer Graph

Figure 2A:
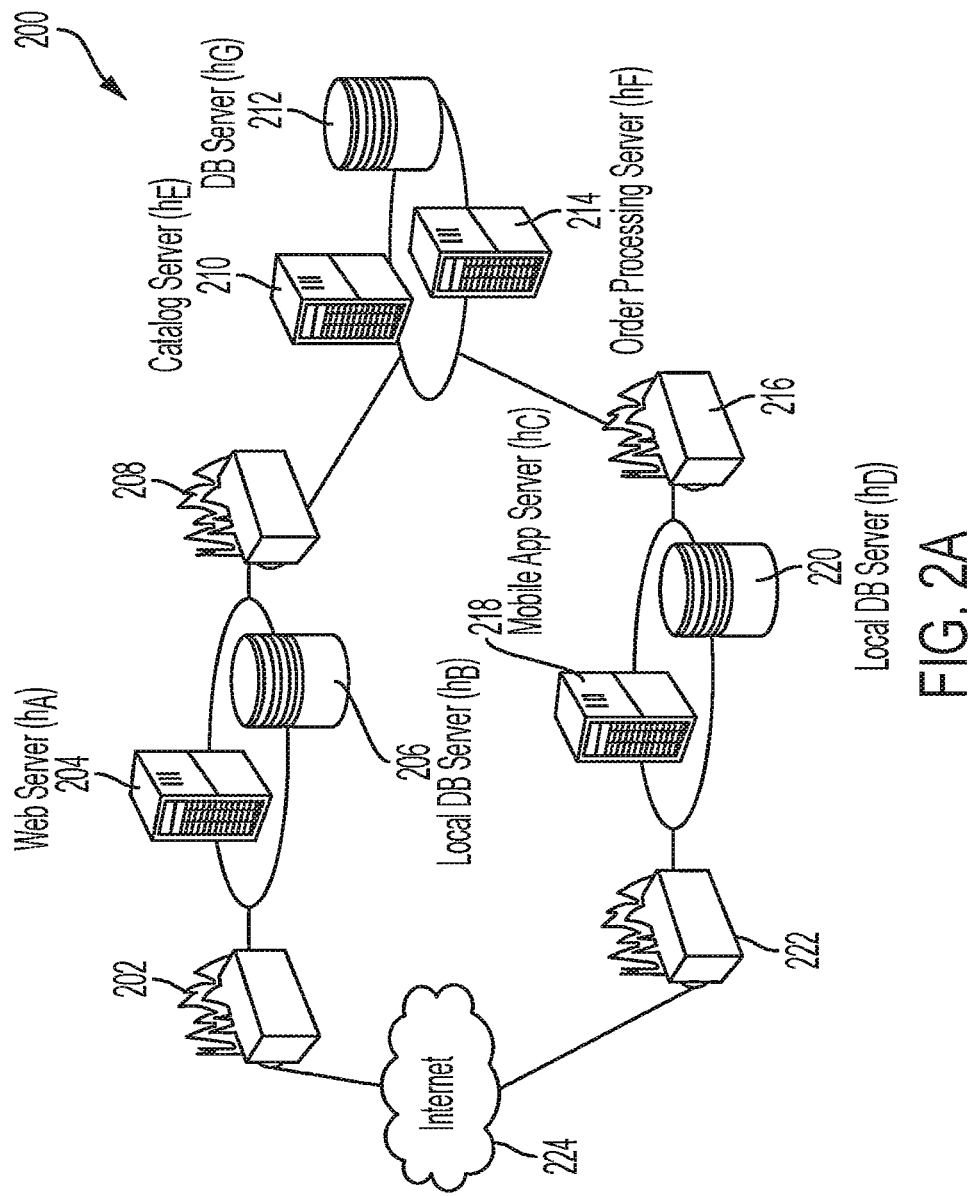
FIG. 2A illustrates an exemplary network diagram of an e-commerce system, in accordance with an embodiment of the present application.

FIG. 2A illustrates an exemplary network diagram 200 of an e-commerce system, in accordance with an embodiment of the present application. Diagram 200 can include clusters or groups of entities separated by firewalls and connected via a network 224 (e.g., the internet). For example, a first set of entities can include a Web Server 204 ($h_A$) and a Local Database Server 206 ($h_B$). The first set of entities can be separated by a firewall 208 from a second set of entities, which can include a Catalog Server 210 ($h_E$), a Database Server 212 ($h_G$), and an Order Processing Server 214 ($h_F$). The second set of entities can be separated by a firewall 216 from a third set of entities, which can include a Mobile Application Server 218 ($h_C$) and a Local Database Server 220 ($h_D$). The third set of entities can be separated by a firewall 222 from network or internet 224, and the first set of entities can be separated by a firewall 202 from network or internet 224. Entities in a same or different group may be dependent upon each other, as depicted below in relation to FIG. 2B.

Figure 2B:
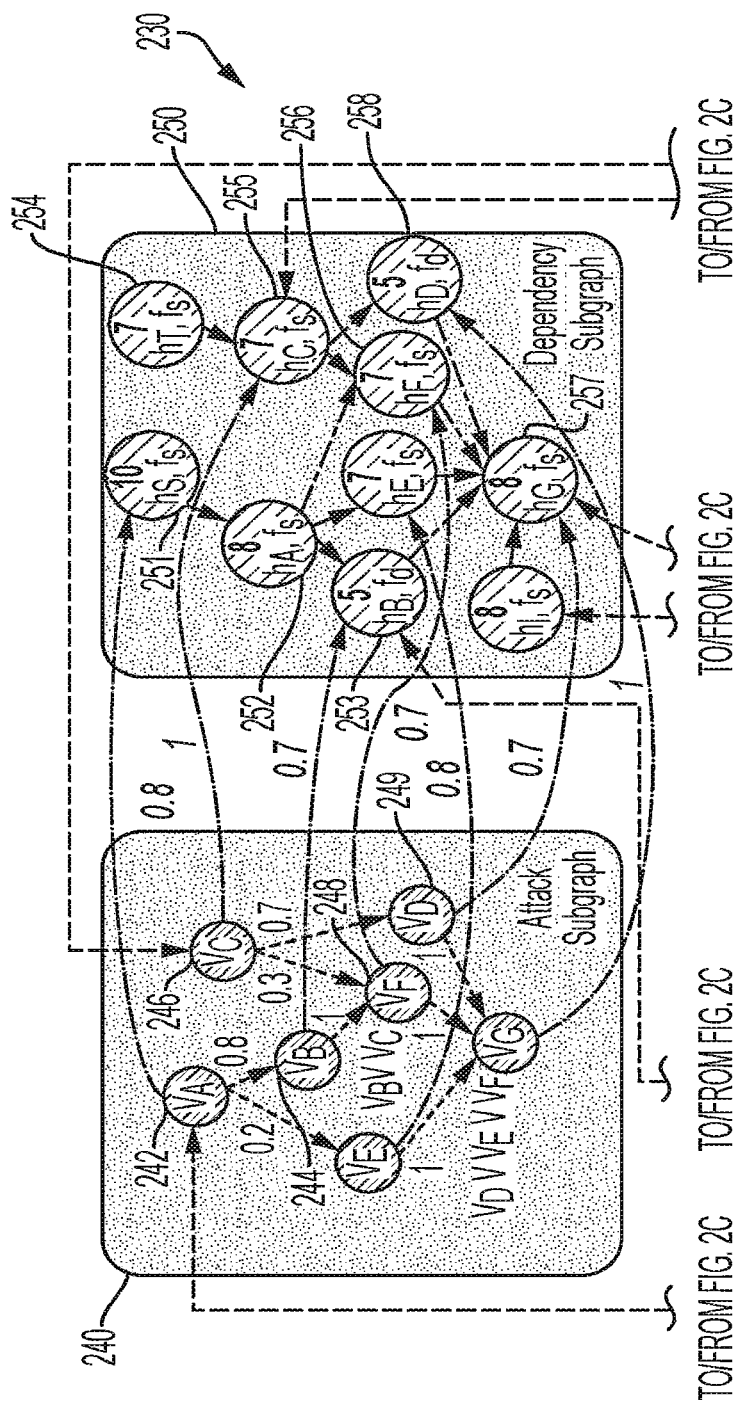
FIGS. 2B and 2C illustrates an exemplary multi-layer graph corresponding to the network diagram of FIG. 2A, in accordance with an embodiment of the present application.
Figure 2C:
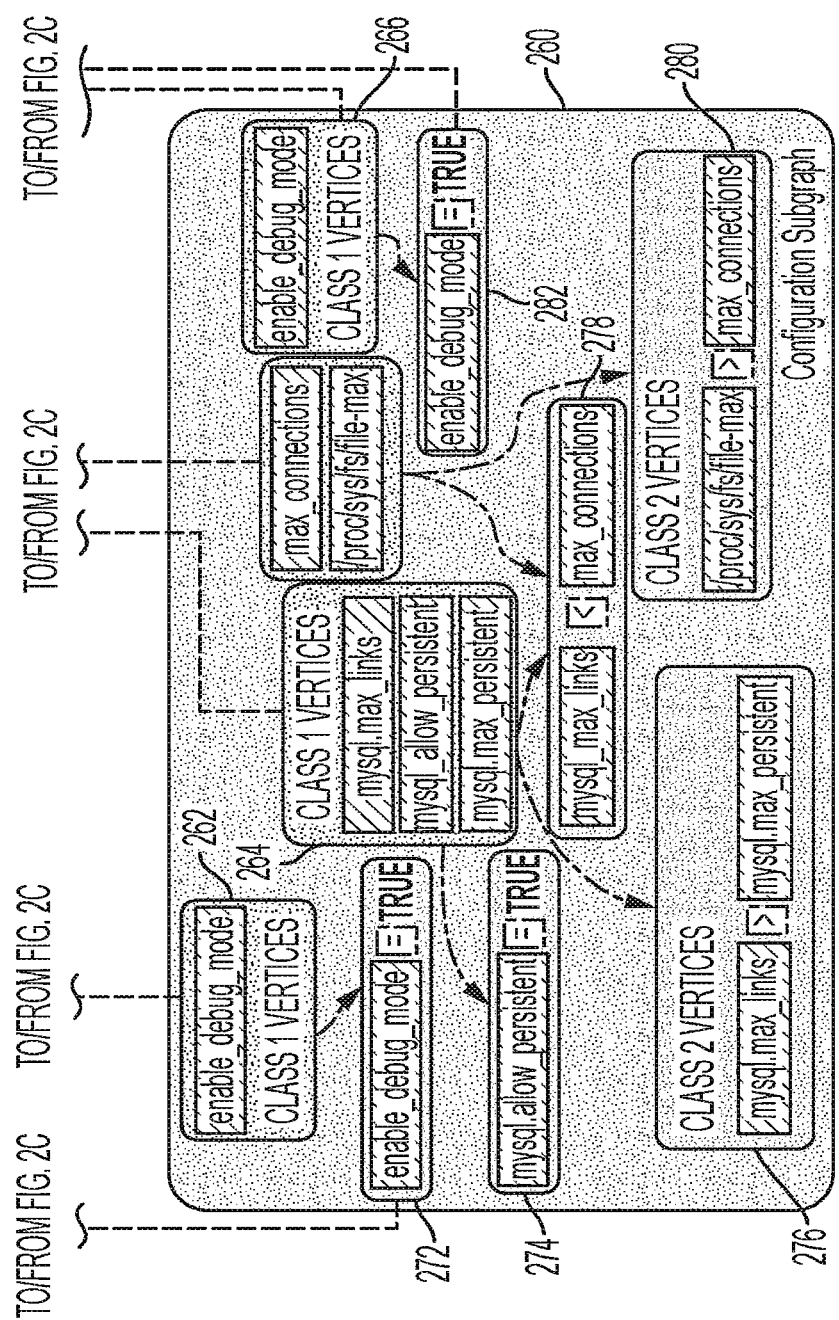

FIGS. 2B and 2C illustrates an exemplary multi-layer graph 230 corresponding to the network diagram of FIG. 2A, in accordance with an embodiment of the present application. Multi-layer graph 230 can include an attack subgraph 240, a dependency subgraph 250, and a configuration subgraph 260.

As described above, modeling framework 104 of FIG. 1 can use the ingested data from data ingestion framework 102 to construct a three-layer directed graph that efficiently encodes the information needed for computing optimal configurations. A first layer can comprise a dependency subgraph, a second layer can comprise a configuration subgraph, and a third layer can comprise an attack subgraph. The edges between these three subgraphs can determine the functional composition and the attack surface for a configuration set, as described in detail below.

The dependency subgraph (subgraph 250) represents the functional dependencies between components of the target composed system. In this subgraph, each vertex represents a functional component of the system and carries a utility value. Each vertex also has a label identifying one of three dependency types, as described below. Each edge in the dependency subgraph represents a functional dependency on another component, as specified by the dependency label of the parent vertex.

The configuration subgraph (subgraph 260) represents relationships between configuration parameters, both within any system component and across different components of the composed system. There are two classes of vertices in the configuration subgraph: a first class of nodes or "Class 1" vertices capture per-component configuration parameters; and a second class of nodes or "Class 2" vertices capture relationships among (or conditions on) the configuration parameters. These relationships are specified by functional system requirements and admissibility of the configuration setting, as described below. Furthermore, some of the relationships between the configuration parameters enable or disable preconditions for system vulnerabilities, which can result in inducing a particular attack subgraph for that configuration. Similar to these relationships among configuration parameters, a particular parameter assignment can also create a precondition for a vulnerability which can be exploited, thus providing an entry point into the attack subgraph.

For example, configuration subgraph 260 can include Class 1 vertices 262, 264, and 266, where each group of Class 1 vertices is depicted in its own box and corresponds to configuration parameters for a specific component depicted in dependency subgraph 250. Furthermore, configuration subgraph 260 can include Class 2 vertices 272, 274, 276, 278, 280, and 282, where each respective Class 2 vertex is depicted in its own box and corresponds to a configuration constraint between configuration parameters (whether between configuration parameters within a same component or across different components), such as the configuration parameters indicated by Class 1 vertices 262-266.

The attack subgraph (subgraph 240) represents the propagation of potential multi-step attacks on components in the dependency graph for a particular configuration. In the attack subgraph, each vertex represents a vulnerability. An edge in the attack subgraph indicates that exploiting the parent vulnerability (a node at the start of a given arrow) can set the stage for the attacker to exploit the child vulnerability (a node at the end of the given arrow). Each edge is also labeled with a probability value or "exploitation likelihood," representing the probability of the attack progressing along that edge. The nodes and edges in attack subgraph 240 are described below.

Exemplary High-Level Multi-Layer Graph

U.S. patent application Ser. No. 16/918,971 describes the construction of the multi-layer graph, with nodes and directed edges, including: modeling dependencies in the dependency subgraph; modeling relationships between configuration parameters, both within and a component and across different components, in the configuration subgraph, where some relationships between configuration parameters may enable or disable preconditions for vulnerabilities in one or more components; and modeling vulnerabilities to represent each possible exploitation or security condition. An example of how nodes from the three subgraphs may affected each other (e.g., via directed edges) is described below in relation to FIGS. 3A and 3B.

Figure 3A:
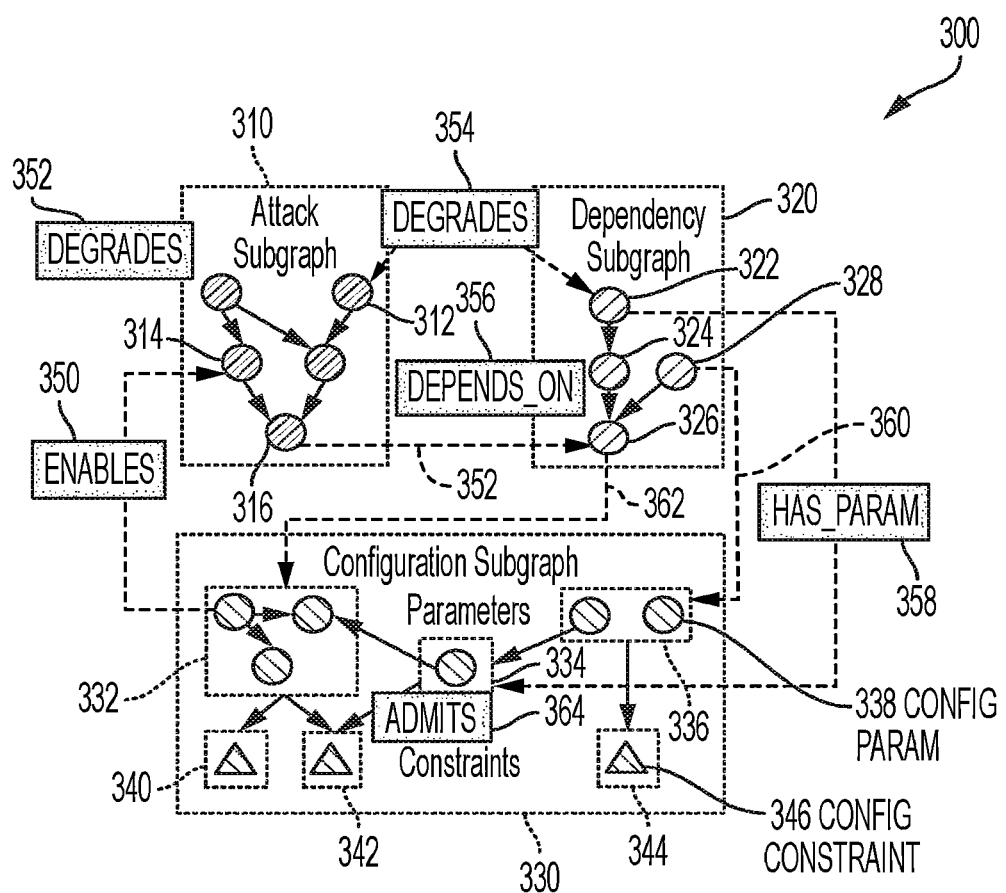
FIG. 3A illustrates an exemplary high-level diagram of a multi-layer graph, including semantics of the relationships among subgraphs, in accordance with an embodiment of the present application.

FIG. 3A illustrates an exemplary high-level diagram 300 of a multi-layer graph, including semantics of the relationships among subgraphs, in accordance with an embodiment of the present application. Diagram 300 can include: an attack subgraph 310, with each vulnerability node depicted as a circle in attack subgraph 310, and relationships between vulnerability nodes depicted as arrows in attack subgraph 310; a dependency subgraph 320, with each component node depicted as a circle in dependency subgraph 320, and relationships between component nodes depicted as arrows in dependency subgraph 320; and a configuration subgraph 330, with configuration parameters depicted as circles and configuration constraints depicted as triangles in configuration subgraph 330.

Configuration subgraph 330 can include two types of nodes or vertices, as described above in relation to FIG. 2B. "Class 1" vertices capture per-component configuration parameters, e.g., the circles in boxes 332, 334, and 336. For example, box 336 includes a configuration parameter 338, which is a Class 1 vertex. "Class 2" vertices capture relationships among (or conditions on) the configuration parameters, e.g., the triangles in boxes 340, 342, and 344. For example, box 344 includes a configuration constraint 346, which is a Class 2 vertex.

In configuration subgraph 330, relationships within and across components are depicted as arrows between the circles, while constraints between and among the components are depicted as arrows between the Class 1 vertices and the Class 2 vertices.

Furthermore, configuration subgraph 330 indicates several semantics regarding the relationships of the nodes within each subgraph as well as the relationships of the nodes across subgraphs, e.g., via directed edges. For example, a configuration constraint 340 enables (350, indicated by a dashed arrow) a vulnerability 314. A vulnerability 316 degrades (352, indicated by a dashed arrow) or represents the exposure factor of the component indicated by a dependency subgraph node 326 based on the exploitation of vulnerability 316. Similarly, a vulnerability 312 degrades (354, indicated by a dashed arrow) or represents the exposure factor of the component indicated by a dependency subgraph node 322 based on the exploitation of vulnerability 312.

In addition, dependency subgraph node 324 depends on (356, indicated with an arrow) dependency subgraph node 326. Dependency subgraph node 322 is associated with or has parameters (358, indicated by a dashed line) indicated in a node of Class 1 vertices in box 334 (e.g., configuration parameters associated with the component represented by dependency subgraph node 322). Similarly, dependency subgraph node 328 is associated with or has parameters (360, indicated by a dashed line) indicated in a node of Class 1 vertices in box 336 (e.g., configuration parameters 338 associated with the component represented by dependency subgraph node 328). Similarly, dependency subgraph node 326 is associated with or has parameters (362, indicated by a dashed line) indicated in a node of Class 1 vertices 332 (e.g., configuration parameters associated with the component represented by dependency subgraph node 326).

Moreover, a configuration subgraph node of a Class 1 vertex in box 334 identifies or admits (364, indicated with an arrow) the relationship of the configuration parameters involved in the configuration constraint of Class 2 vertex 342.

U.S. patent application Ser. No. 17/350,221 describes ways to quantify different dimensions of the vulnerability subgraph, including the "exploitation likelihood" (or "likelihood") of a vulnerability as the probability that an attacker will attempt to exploit that vulnerability. U.S. patent application Ser. No. 17/350,221 also describes computing a probability distribution over outgoing directed edges from any given vulnerability node to another vulnerability node (defined as "ENABLES" edges). U.S. patent application Ser.

No. 17/350,221 further describes how the "exposure factor" can represent the relative damage that an undesirable event (e.g., an exploitation of a vulnerability) may cause to an affected asset.

Figure 3B:
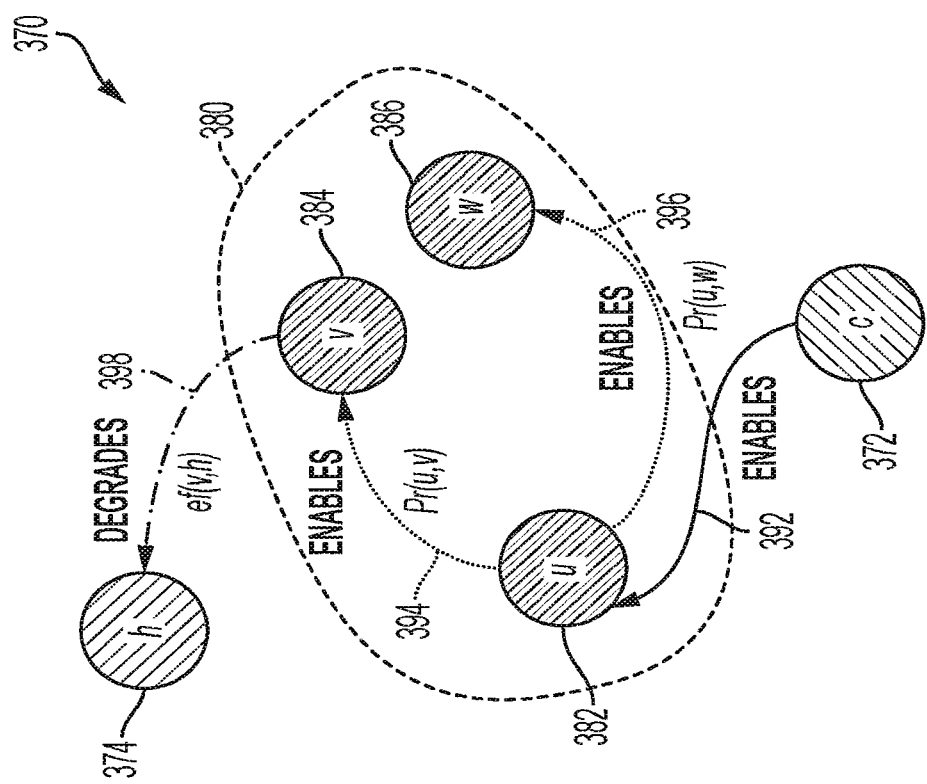
FIG. 3B illustrates an exemplary diagram of nodes in a multi-layer graph, including directed edges between nodes, in accordance with an embodiment of the present application.

FIG. 3B illustrates an exemplary diagram 370 of nodes in a multi-layer graph, including directed edges between nodes, in accordance with an embodiment of the present application. Diagram 370 can include nodes from the three subgraphs: a configuration node c 372; an exposed vulnerability node u 382 and non-exposed vulnerability nodes v 384 and w 386 in a vulnerability subgraph 380; and a component node h 374. Directed edges between the nodes can depict certain dependencies between the depicted nodes as well as potential attack paths taken by an attacker. For example, an enables edge 392 can indicate that the attacker may exploit vulnerability u 382 associated with node c 372 in the configuration subgraph. For each node in vulnerability subgraph 380, the system can compute a probability distribution over outgoing enables edges, i.e., enables edges 394 and 396 from node 382. Each node in vulnerability subgraph 380 can be associated with an exploitation likelihood ρ(v). In addition, the system can determine the exposure factor which represents the relative damage to an asset in the overall system that would be caused due to the exploitation of a vulnerability. For example, a degrades 398 edge can indicate that the exploitation of vulnerability v 384 can degrade component h 374 based on an exposure factor (indicated as ef(v,h)). Determining the exploitation likelihood for a vulnerability and the exposure factor of a component based on exploitation of an associated vulnerability are described in U.S. patent application Ser. No. 17/350,221.

Calculating the Propagation of Security Impact Using Multi-Dimensional Metrics

Current Limitations

The Common Vulnerability Scoring System (CVSS) (both version 2.0 and version 3.0) considers the impacts of a vulnerability on confidentiality, integrity, and availability as three separate metrics: "ConfImpact"; "IntegImpact"; and "AvailImpact." CVSS can combine these three impact metrics into one "Impact" base score. CVSS can then combine the Impact score with the "Exploitability" score to determine the "Base Score." For example, in CVSS 2.0, Impact can be defined as:

10.41·(1−(1−ConfImpact)·(1−IntegImpact)·(1−AvailImpact)), where ConfImpact, IntegImpact, and AvailImpact are defined as below:

| CVSS 2.0 | ConfImpact | IntegImpact | AvailImpact |
| --- | --- | --- | --- |
| None | 0.000 | 0.000 | 0.000 |
| Partial | 0.275 | 0.275 | 0.275 |
| Complete | 0.660 | 0.660 | 0.660 |

In the described embodiments, the overall system can use a dependency model to assess the propagation of impacts through the system. For example, when a component c1 depends on a component c2, any impact on c2 is propagated to c1, regardless of the nature of the impact and which specific multi-dimensional properties (i.e., Confidentiality, Integrity, and Availability) of c2 depend on c1. The overall system can represent the fraction of the impact on c2 that propagates to c1 as an exposure factor labeling the edge from c1 to c2. The calculation of this exposure factor is described in U.S. patent application Ser. No. 17/350,221.

One can solve for multiple, independent, metric dimensions several ways. One way is to create one graph per dimension and then solve each graph separately. One could find the marginal utility loss of relaxing a constraint by summing the losses over the graphs. This method, however, does not work if there is a dependency between the metrics and is inefficient for large graphs. One could use a multi-graph, where there are parallel edges between nodes representing each non-zero metric. This is more compact and efficient than using one graph per metric, but it still does not easily accommodate covariant metrics. The disclosed embodiments of using a vector (or diagonal matrix) of metrics per edge is a compact representation, and it also allows covariance of metrics in the Logic operator and Combiner operator, as described below.

The use of this dependency model can result in some limitations, as shown below in relation to FIG. 4A. It may be presumed that a large social media platform (e.g., Facebook) does not depend upon any third party applications, and instead, that the third party applications depend upon Facebook, especially since the third party applications may exist only within the ecosystem of Facebook. However, security incidents involving third party applications to a larger platform (e.g., Facebook) have been reported. In such incidents, misconfiguration of a public storage service which stores the third party application's data (e.g., an Amazon Web Services Simple Storage Service (AWS S3) bucket) may result in the leakage of data stored by the public storage service. This data can include data which was shared with the third party application by users of the platform (e.g., Facebook users). The data leakage by the public storage service used by the third party application can affect the users of the platform (e.g., Facebook users), thus revealing a cyclical dependency.

Figure 4A:
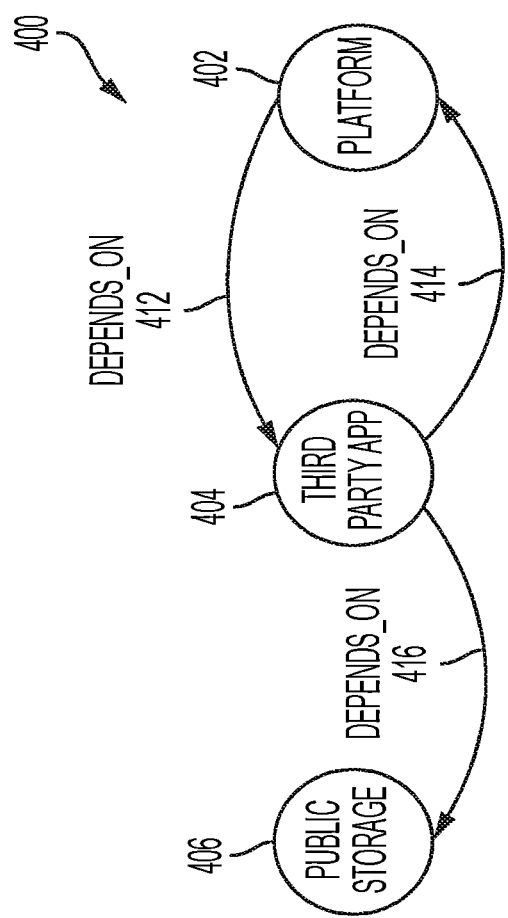
FIG. 4A depicts a diagram of an exemplary cyclical dependency between components, in accordance with an embodiment of the present application.

FIG. 4A depicts a diagram 400 of an exemplary cyclical dependency between components, in accordance with an embodiment of the present application. Diagram 400 includes nodes which indicate: a platform 402 (e.g., Facebook); a third party application ("app") 404; and a public storage 406 (e.g., an AWS S3 bucket). Based on the above example, platform 402 depends on third party app 404 (indicated by a DEPENDS_ON 412 edge). Similarly, third party app 404 depends on platform 402 (indicated by a DEPENDS_ON 414 edge). Additionally, third party app 404 depends on public storage 406 (indicated by a DEPENDS_ON 416 edge). While it is true that a compromise of platform 402 may affect any dependent third party apps (such as third party app 404), it is also true that the confidentiality of the data of some users (i.e., platform users who shared their data with third party app 404) depends on the confidentiality of the data being preserved by the third party application and by public storage 406. The current model cannot represent this scenario.

Enhanced Dependency Model Using Multi-Dimensional Metrics

The described embodiments provide a solution to representing the scenario depicted in FIG. 4A by using a high-fidelity dependency model which can separately track the propagation of the vulnerability impacts on multiple dimensions (e.g., the multi-dimensional metrics of Confidentiality, Integrity, and Availability) across the overall system (i.e., a system of interdependent components).

The system can label each DEGRADES edge from a vulnerability v to a component c with a triple $(ef_c, ef_i, ef_a)$ which quantifies the exposure of c to v with respect to each of its Confidentiality, Integrity, and Availability ("C, I, A") properties, respectively. The system can also label each DEPENDS_ON edge from a component $c_2$ to a component $c_1$ with a triple ($w_c$, $w_i$, $w_a$) which quantifies the fraction of the impact of each property (C, I, A) of $c_2$ that is propagated to the dependent component $c_1$.

Figure 4B:
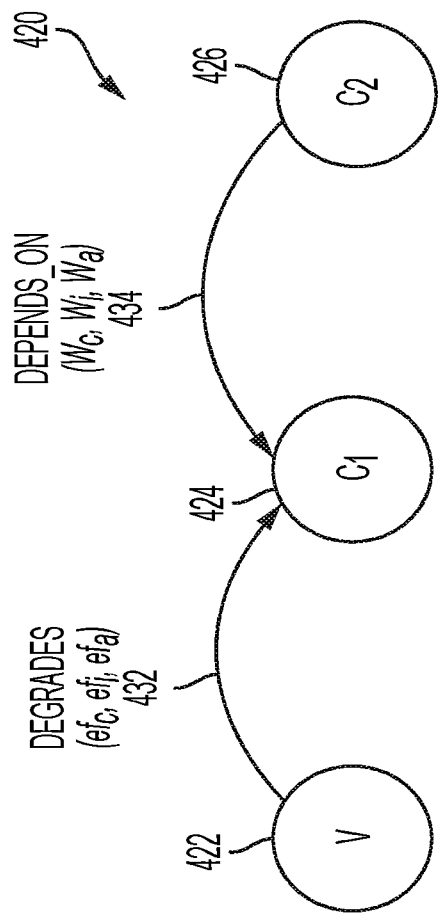
FIG. 4B depicts a diagram of an enhanced dependency model which tracks multi-dimensional metrics, in accordance with an embodiment of the present application.

FIG. 4B depicts a diagram 420 of an enhanced dependency model which tracks multi-dimensional metrics, in accordance with an embodiment of the present application. Diagram 420 includes nodes which indicate: a vulnerability v 422; a component $c_1$ 424; and a component $c_2$ 426. Vulnerability v 422 has a certain impact on component $c_1$ 424 (indicated by a DEGRADES 432 edge and quantified by ($ef_c$, $ef_i$, $ef_a$)). That is, if vulnerability v 422 is exploited in one of the multiple dimensions of (C, I, A), the impact on component $c_1$ 424 can be quantified by the exposure factor calculated for the specific dimension of (C, I, A). This calculation can be performed in the manner described in U.S. patent application Ser. No. 17/350,221.

Furthermore, component $c_2$ 426 depends on component $c_1$ 424 by a certain amount or weight (indicated by a DEPENDS_ON 434 edge and quantified by ($w_c$, $w_i$, $w_a$)). That is, if vulnerability v 422 is exploited in one of the multiple dimensions of (C, I, A), the impact on component $c_2$ 426 (which depends upon component $c_1$ 424 which is directly degraded by vulnerability v 422) can be quantified based on the weight for the specific dimension of (C, I, A). A detailed description of how this enhanced dependency model can apply to the example of FIG. 4A is provided below in relation to FIG. 4C.

Figure 4C:
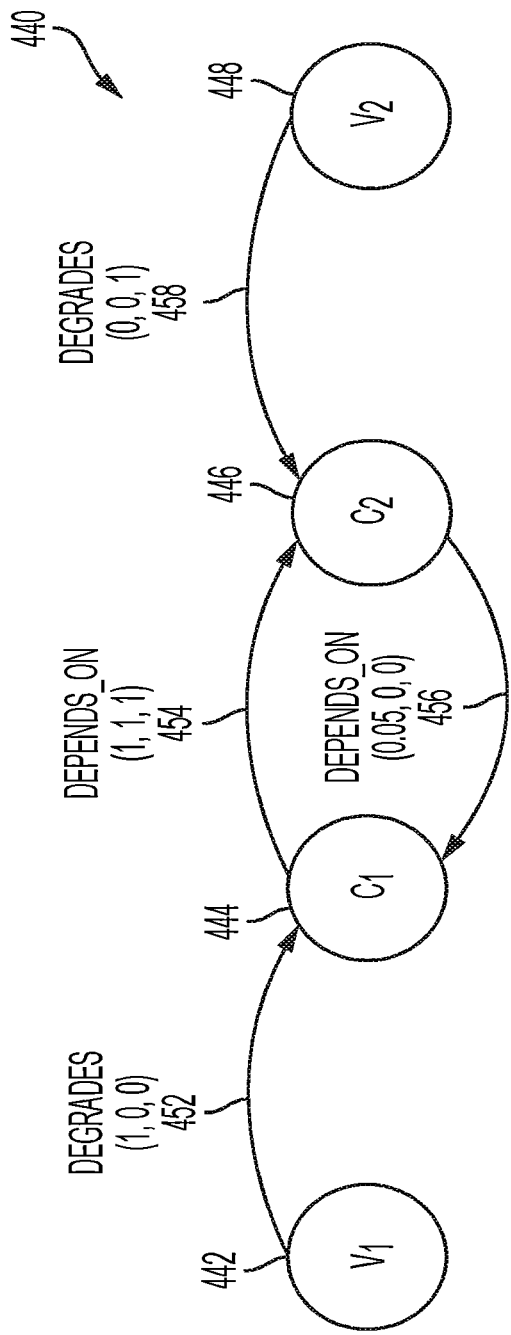
FIG. 4C depicts a diagram of an enhanced dependency model which tracks multi-dimensional metrics, including a cyclical dependency, in accordance with an embodiment of the present application.

FIG. 4C depicts a diagram 440 of an enhanced dependency model which tracks multi-dimensional metrics, including a cyclical dependency, in accordance with an embodiment of the present application. Diagram 440 includes nodes which indicate: a vulnerability $v_1$ 442; a component $c_1$ 444 (e.g., a third party app); a component $c_2$ 446 (e.g., Facebook); and a vulnerability $v_2$ 448. Exploitation of vulnerability $v_1$ 442 can compromise the confidentiality of component $c_1$ 444 (e.g., a third party app) and have a certain impact on component $c_1$ 444. This impact can be indicated by a DEGRADES 452 edge, where the exposure factors across the three dimensions $ef_c$, $ef_i$, $ef_a$ can be referred to as weights and can be quantified by (1, 0, 0). That is, vulnerability $v_1$ 442 can compromise or impact the confidentiality of the third party app, and the amount of the impact is 100% (indicated as 1 in (1, 0, 0)). Furthermore, vulnerability $v_1$ 442 does not compromise or impact either the integrity or the availability of the third party app (indicated as 0 and 0 in (1, 0, 0)).

Similarly, exploitation of vulnerability $v_2$ 448 can compromise the availability of component $c_2$ 446 (e.g., Facebook) and have a certain impact on component $c_2$ 446. This impact can be indicated by a DEGRADES 458 edge, where the exposure factors across the three dimensions of $ef_c$, $ef_i$, $ef_a$ can be referred to as weights and can be quantified by (0, 0, 1). That is, vulnerability $v_2$ 448 can compromise or impact the confidentiality of the Facebook platform, and the amount of the impact is 100% (indicated as 1 in (0, 0, 1)). Furthermore, vulnerability $v_2$ 448 does not compromise or impact either the confidentiality or the integrity of the Facebook platform (indicated as 0 and 0 in (0 0, 1)).

Diagram 440 also indicates a cyclical dependency between components $c_1$ 444 and $c_2$ 446. Component $c_1$ 444 depends upon component $c_2$ 446 across multiple dimensions with different impacts, as indicated by a DEPENDS_ON 454 edge and quantified by a tuple of weights (1, 1, 1). Component $c_2$ 446 depends upon component $c_1$ 444 across multiple dimensions with different impacts, as indicated by a DEPENDS_ON 456 edge and quantified by a tuple of weights (0.5, 0.0). For example, the third party app ($c_1$ 444) is 100% dependent upon the Facebook platform ($c_2$ 446). If the confidentiality, integrity, or availability of Facebook is compromised, then the impact on the confidentiality, integrity, or availability of the Facebook platform propagates 100% to the corresponding confidentiality, integrity, or availability of the third party (as indicated by (1, 1, 1) in DEPENDS_ON 454 edge). Thus, the tuple (1, 1, 1) can indicate how much of the damage of each dimension to component $c_2$ 446 propagates to the corresponding dimension of component $c_1$ 444, which is dependent upon component $c_2$ 446.

In the other direction, Facebook is only impacted by a small percentage of dependency upon the confidentiality of the third party app. That is, if the integrity of the third party app is compromised (e.g., vulnerability $v_1$ 442 represents a security leak regarding user information), then the confidentiality of Facebook is compromised by 5%, while any compromises to the integrity or availability of the third party app have no impact on the integrity or availability of Facebook (as indicated by (0.05, 0, 0) in DEPENDS_ON 456 edge). Thus, the tuple (0.05, 1, 1) can indicate how much of the damage of each dimension to component $c_1$ 444 propagates to the corresponding dimension of component $c_2$ 446, which is dependent upon component $c_1$ 444. The 0.05 value for the confidentiality dimension of DEPENDS_ON edge 456 can represent the percentage of Facebook users who use and have shared confidential user information with the third party application. The (C, I, A) dimensions of each tuple can be pre-configured or dynamically configured based on various factors, e.g.: a number of users; a total number of users; and statistics relating to bandwidth, availability, consumption, traffic rates, time, and/or error rates.

Thus, the enhanced dependency model depicted in FIG. 4C illustrates how multiple dimensions can be propagated through a system of interconnected components and dependencies.

Generalization of Enhanced Dependency Model

The enhanced dependency model depicted above in relation to FIGS. 4B and 4C can include vulnerabilities which are based on common vulnerabilities and exposures (CVE) based on a national vulnerability database (NVD). The vulnerabilities can also be based on non-CVE vulnerabilities, as long as the system can estimate the relative impact of each such vulnerability on the (C, I, A) properties, similar to how such impacts are defined for the CVE entries (e.g., how CVSS scores are assigned to new vulnerabilities). The system can use these values to compute the Impact and Exploitability scores, which are then used to calculate the exposure factor and the exploit likelihood metrics, as described in U.S. patent application Ser. No. 17/350,221. An example of a non-CVE vulnerability can be a predefined bad security practice or best security practice, such as a weak or frequently used password. Non-CVE examples are described in U.S. patent application Ser. No. 16/923,763.

Furthermore, the enhanced dependency model can include additional security properties $p_1, p_2, \ldots p_n$. The system can add one or more dimensions to the (C, I, A) tuple. For example, DEGRADES edges can be labeled with a tuple ($ef_c$, $ef_i$, $ef_a$, $ef_{p1}$, $ef_{p2}$, …, $ef_{pn}$), and DEPENDS_ON edges can be labeled with a tuple ($w_c$, $w_i$, $w_a$, $w_{p1}$, $w_{p2}$, …, $w_{pn}$). One additional security property can be reputation or the damage to reputation of a company represented by a component or dependency node in the system. For example, the reputation of a fire suppression company could become damaged if a vulnerability such as "company headquarters on fire" is exploited. Certain assets or components of the fire suppression company may be considered more important if reputation is to be considered as a priority, e.g., optimized for in selecting certain configuration parameters for the system components. When considering the reputation dimension, any components relating to preventing fire in the building may be more important than other components in the building, and the system can use a higher exposure factor for the fire prevention-related components in order to prevent damage to the company's reputation (e.g., by optimizing or selecting a configuration which considers the high exposure factor of the vulnerabilities related to the fire prevention-related components).

While this disclosure focuses on security properties, the additional properties $p_1, p_2, \ldots p_n$ are not necessarily limited to security properties and can include any dimension or property as long as the system can define how a certain vulnerability degrades that dimension and how the exploitation of the certain vulnerability would propagate that dimension through the enhanced dependency model. In general, additional properties can exhibit similar properties as the discussed (C, I, A) dimensions, including that each property is independent of the other properties and does not depend on another property.

As described above in relation to FIG. 4C, the elements of the tuples (for both DEGRADES and DEPENDS_ON edges) can label the edges as "weights," which can be specified in one of two forms. In the first form, weights can be specified using real numbers from 0 to 1: [0, 1]. In the second form, discrete values can be used, such as {none, low, medium, high}, and the system can translate these discrete values into numeric values (similar to the CVSS example provided above).

Operator Methodology for Security Impact Propagation

The described embodiments can take the multi-dimensional tuples (e.g., vectors) of the enhanced dependency model and integrate them into the overall system to determine the impact of the propagation through the entire system. As described above, the overall system can include interconnected components, constraints on the parameters of the components, and vulnerabilities which can degrade the components, as depicted by the multiple subgraphs of the overall SCIBORG graph of FIGS. 2B, 2C, and 3A. The overall system can use algebraic models to compute the utility loss of constraint relaxation. The described embodiments can further represent the system using a math operator approach, including a Combiner operator and a Logic operator, as described below in relation to FIGS. 5A and 7. Thus, the input to the overall system is a series of values corresponding to whether one or more constraints to the system have been relaxed (e.g., a security or functional constraint as indicated by a given relaxation). The output of the overall system is the single loss expectancy corresponding to each relaxation, e.g., of a given relaxation.

The described system of impact propagation can use a vector to represent the impact of a vulnerability. As described above, CVSS scores can be represented as a three-dimensional vector, and an averaged CVSS score (as described in U.S. patent application Ser. No. 17/350,221) can be represented as a one-dimensional scalar. The described embodiments, which employ security operators, can use diagonal matrices to represent the security vector dimensions. Square matrices and security operators are described below in relation to FIG. 5A, in which diagonal or square matrices used to represent the security vector dimensions are denoted with bold font, and the security operators themselves are denoted in cursive font ($\mathcal{L}$ and $\mathcal{C}$).

Exemplary Single Path and Relationships Between Entities

Figure 5A:
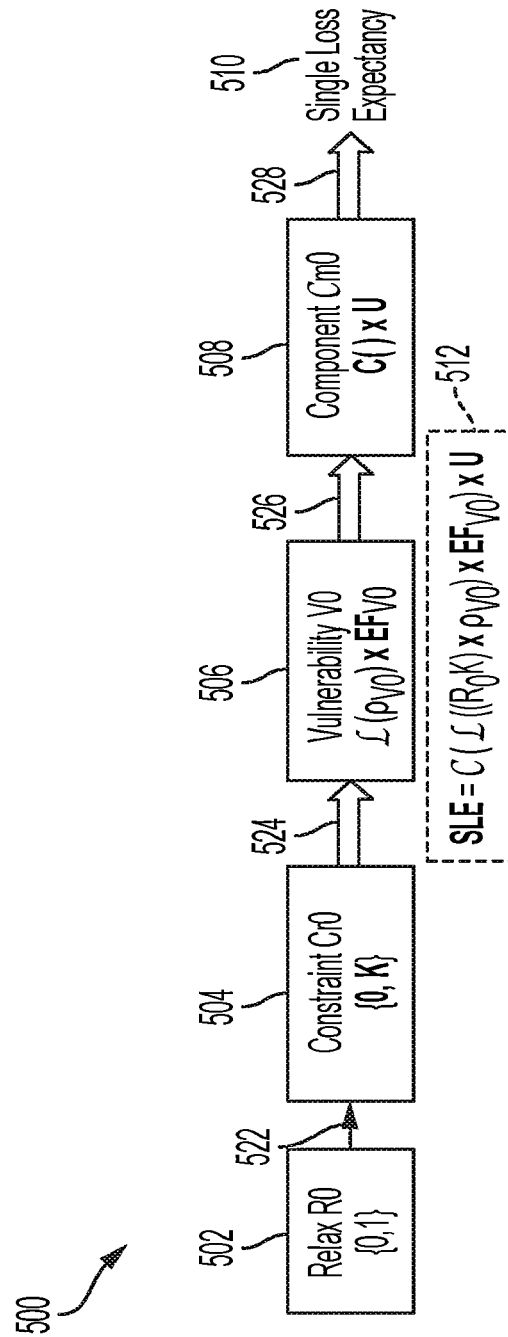
FIG. 5A depicts a diagram of an exemplary single path including a constraint with an on/off value, a vulnerability, a component, and a resulting loss of utility, in accordance with an embodiment of the present application.

FIG. 5A depicts a diagram 500 of an exemplary single path including a constraint Cr0 504 with an on/off value, a vulnerability V0 506, a component Cm0 508, and a resulting loss of utility 510, in accordance with an embodiment of the present application. In diagram 500, single arrows (e.g., 522) can be used to indicate scalar propagation, while double arrows (e.g., 524, 526, and 528) can be used to indicate matrix propagation. A relaxation trigger R0 502 can have a value of either 0 or 1: {0, 1}, where a value of 0 indicates that R0 is not relaxed and a value of 1 indicates that R0 is relaxed. Constraint Cr0 504 can have a normalization factor K, over all vulnerabilities' exploitability $\rho_{vi}$. In this example, that factor can be the scalar $1/\rho_{v0}$. A constraint can enable multiple vulnerabilities and can be represented by a vector because DEGRADES probabilities can also be represented by a vector.

Vulnerability v0 506 can include three parts: a Logic operator $\mathcal{L}(\ )$; an exploitability $\rho_{vi}$; and an exposure factor $EF_{vi}$. The exploitability and exposure factor are described in U.S. patent application Ser. No. 17/831,848. The Logic operator $\mathcal{L}(\ )$ can express how AND and OR vulnerability logic may combine multiple inputs. If a vulnerability is enabled by more than one constraint, the system can combine those multiple inputs by using the Logic operator, as described below.

Component Cm( ) 508 can include two parts: a dependency Combiner operator $\mathcal{C}$; and a utility matrix U. The matrix diagonal can represent the importance of the component in each dimension. For example, a single replica of a credit card database may have very high confidentiality importance, but low availability importance as multiple replicas of the database may exist. A component can be degraded by more than one vulnerability, so the Combiner operator $\mathcal{C}$ can represent or indicate how to combine the impact of degradation by multiple vulnerabilities (including both direct and indirect vulnerabilities).

A vulnerability can use either AND or OR logic to combine its multiple inputs. The $\mathcal{L}_k$ operator on vulnerability $V_k$ can combine the various input matrices $Y_{ki}$ with the vulnerability's exploitability matrix $\rho_k$. Let 1 denote the matrix diag([1 1 1 . . . ]).

$$\mathcal{L}_k([Y_{k1}, \ldots, Y_{kn}]) = \Pi \rho_k Y_{ki} \text{ AND logic} \qquad \text{Eq. (1)}$$

$$\mathcal{L}_k([Y_{k1}, \ldots, Y_{kn}]) = 1 - \Pi(1 - \rho_k Y_{ki}) \text{ OR logic} \qquad \text{Eq. (2)}$$

When using AND logic, the Logic operator $\mathcal{L}$ can indicate a product of the probabilities and return the probability that all enabling elements have been relaxed (i.e., have a positive value or a value of 1). If any element is not relaxed (i.e., has a value of 0), then the result is 0. When using OR logic, the Logic operator $\mathcal{L}$ can indicate 1 minus the product of the negation of the probabilities, and can return the probability that at least one enabling element is relaxed. If no enabling elements are relaxed, then the result is 0. While the described embodiments use AND or OR logic as the Logic operator, other Logic operators may be used depending on how certain constraints are to be combined as multiple inputs into a vulnerability. The system can determine which Logic operator to use based on, e.g., the type of constraint which enables a respective vulnerability.

The Combiner operator $\mathcal{C}$ can describe how a component depends upon one or more vulnerabilities (e.g., as direct vulnerabilities) or other components (e.g., as indirect vulnerabilities). The Combiner operator $\mathcal{C}$ can take a set of inputs Z, where $Z=\mathcal{L}_i EF_i$ for direct vulnerabilities and $Z=\mathcal{C}\mathcal{L}_j EF_j$ for indirect vulnerabilities or dependencies. In both cases (of direct and indirect vulnerabilities), the set of inputs Z can represent the weighted probability that a given impact dimension is degraded. The output of the Combiner operator $\mathcal{C}$ can be the "loss factor" for each impact dimension. The loss factor is indicated as single loss expectancy 510 in FIG. 5A. The loss factor can multiply the utility matrix U to provide the amount of utility lost given the set of input relaxations. A loss factor of 0 for an impact dimension means that no utility is lost in that dimension. The loss factor can range in value from 0 to 1: [0, 1].

As described in U.S. Pat. No. 11,025,661, the system can broadly classify dependencies among network entities into three categories: scaled; strict; and redundant. In a scaled dependency (or a graceful degradation), a network component depends on a pool of other components such that, if one fails, the system can continue to work with degraded performance. That is, a dependent component can degrade in proportion to its dependency. For example, an order processing system may degrade in throughput proportional to how the availability of its corresponding database degrades. In a strict dependency, a network component strictly depends on a pool of other components, such that, if one fails, the dependent component becomes unavailable. That is, a dependent component fails if any dependency is degraded at all. In a redundant dependency, a network component depends on a redundant pool of resources, such that a dependent component only fails if all dependencies are degraded. A dependency may also be a proportional dependency, in which the respective component degrades by a fixed factor if a first component is impacted.

H(X) is the Heaviside operator, which is defined as 1 if x>0 and defined as 0 if otherwise. The system can apply the Heaviside operator H(X) element-wise to the matrix X. The set of matrices, $\mathbb{W}$, can indicate how strongly the component $Cm_k$ depends on its inputs. Each input i can have its own corresponding weight matrix $W=\mathbb{W}_i$. The results of the Combiner operator $\mathcal{C}$ on the various categories of dependencies can be expressed as follows:

$$\mathcal{C}_k([Z_{k1}, \ldots, Z_{kn}]) = (1-\Pi(1-W_{ki}Z_{ki})) \text{ If scaled} \quad \text{Eq. (3)}$$

$$\mathcal{C}_k([Z_{k1}, \ldots, Z_{kn}]) = (1-\Pi(1-H(W_{ki}Z_{ki}))) \text{ If strict} \quad \text{Eq. (4)}$$

$$\mathcal{C}_k([Z_{k1}, \ldots, Z_{kn}]) = \Pi H(W_{ki}Z_{ki}) \text{ If redundant} \quad \text{Eq. (5)}$$

$$\mathcal{C}_k([Z_{k1}, \ldots, Z_{kn}]) = (1-\Pi(1-W_{ki}H(Z_{ki}))) \text{ If proportional} \quad \text{Eq. (6)}$$

If an input i is a vulnerability, the weight matrix $W_i$ can describe how the vulnerability affects the component. For example, if a component only has an integrity dependency on the vulnerability, the corresponding weight matrix may be W=diag ([0 1 0]). Weight matrices for vulnerabilities are generally 0-1 diagonals because the weighting can be derived from the exposure factor of the respective vulnerability.

If an input i is a component dependency, the weight matrix $W_i$ can describe how the dependency degrades the component. For a scaled dependency type, the diagonal of W can take any value in [0, 1]. For strict and redundant dependency types, W may still use [0, 1] diagonals or may simply be a 0-1 diagonal as the Heaviside function will filter out other factors.

In the case of the scaled dependency type, each diagonal element of the output can represent the loss factor. For a given impact dimension, the loss factor can be indicated by the weighted probability that any dependency is degraded. As an example, assume that WZ is zero for all dimensions, then the product can be the 1 diagonal matrix, such that the output will be the 0 matrix (which indicates no loss in utility). Similarly, assume that WZ is 1 for all dimensions, then the output will be the 1 diagonal matrix (which indicates a complete loss in utility).

In the case of the strict dependency type, the system can use the Heaviside function of the WZ trace. If any element of the trace is greater than 0, then that element of H(WZ) is 1; otherwise, that element is 0. Thus, if any trace element of any input is positive, the product can contain a 0 term, such that the entire product is 0 and the output is 1.

In the case of the redundant dependency type, if any input has a 0 trace element, then that trace element will be 0 from the product and will result in a loss factor of 0. If all inputs of a trace element are non-zero, then they will all be 1 and will result in a loss factor of 1.

In the case of proportional dependency, the utility loss factor is only from the W matrix entries that have a non-zero input Z.

Thus, the resulting loss of utility 510 or single loss expectancy (SLE) 510 can be calculated based on a formula 512, where square or diagonal matrices are denoted with a bold font:

$$SLE = \mathcal{C}(\mathcal{L}_{(R_0 K) \times \rho_{v0}} \times EF_{v0}) \times U \quad \text{Eq. (6)}$$

Figure 5B:
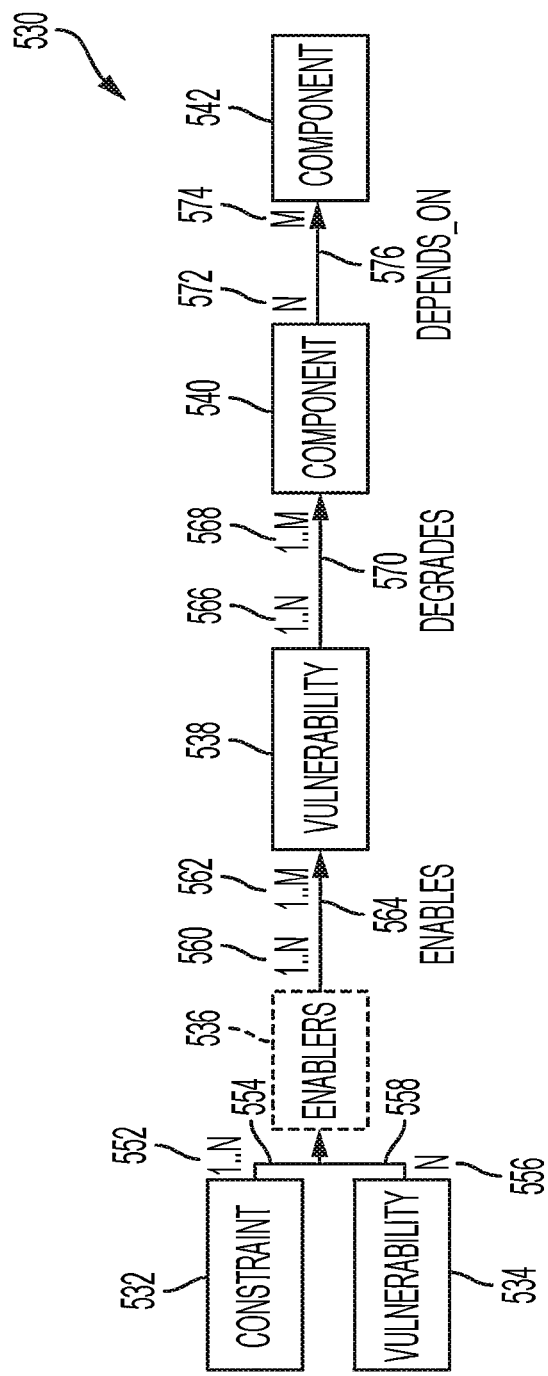
FIG. 5B depicts a diagram of exemplary relationships between constraints, vulnerabilities, and components, in accordance with an embodiment of the present application.

As described above, in U.S. Pat. No. 11,025,661 and in U.S. patent application Ser. No. 16/923,763, the system can allow a certain composition of constraints, vulnerabilities, and components. FIG. 5B depicts a diagram 530 of exemplary relationships between constraints, vulnerabilities, and components, in accordance with an embodiment of the present application. A vulnerability must be enabled by one or more constraints or vulnerabilities. A security constraint must enable one or more vulnerabilities. A vulnerability may enable zero or more other vulnerabilities. In diagram 530, a constraint 532 and a vulnerability 534 can make up (indicated by 554 and 558) enablers 536 (indicated by a dotted line to note that this is a logical grouping of entities). Constraint 532 can number from 1 to N and vulnerability 534 can be numbered N (indicated by elements 552 and 556, respectively). A number of 1 to N enablers 536 can enable a number of 1 to M vulnerabilities, such as a vulnerability 538 (indicated by elements 560, 564, and 562, respectively).

A vulnerability must degrade one or more components. A component may depend on zero or more other components, and similarly, a component may be the dependent of zero or more other components. In diagram 530, a number of 1 to N vulnerabilities can degrade a number of 1 to M components, such as a component 540 (indicated by elements 566, 570, and 568, respectively). A number of N components can depend on a number of M components, such as a component 542 (indicated by elements 572, 576, and 574, respectively).

Exemplary Graph Model and Corresponding Operator Representation

Figure 6:
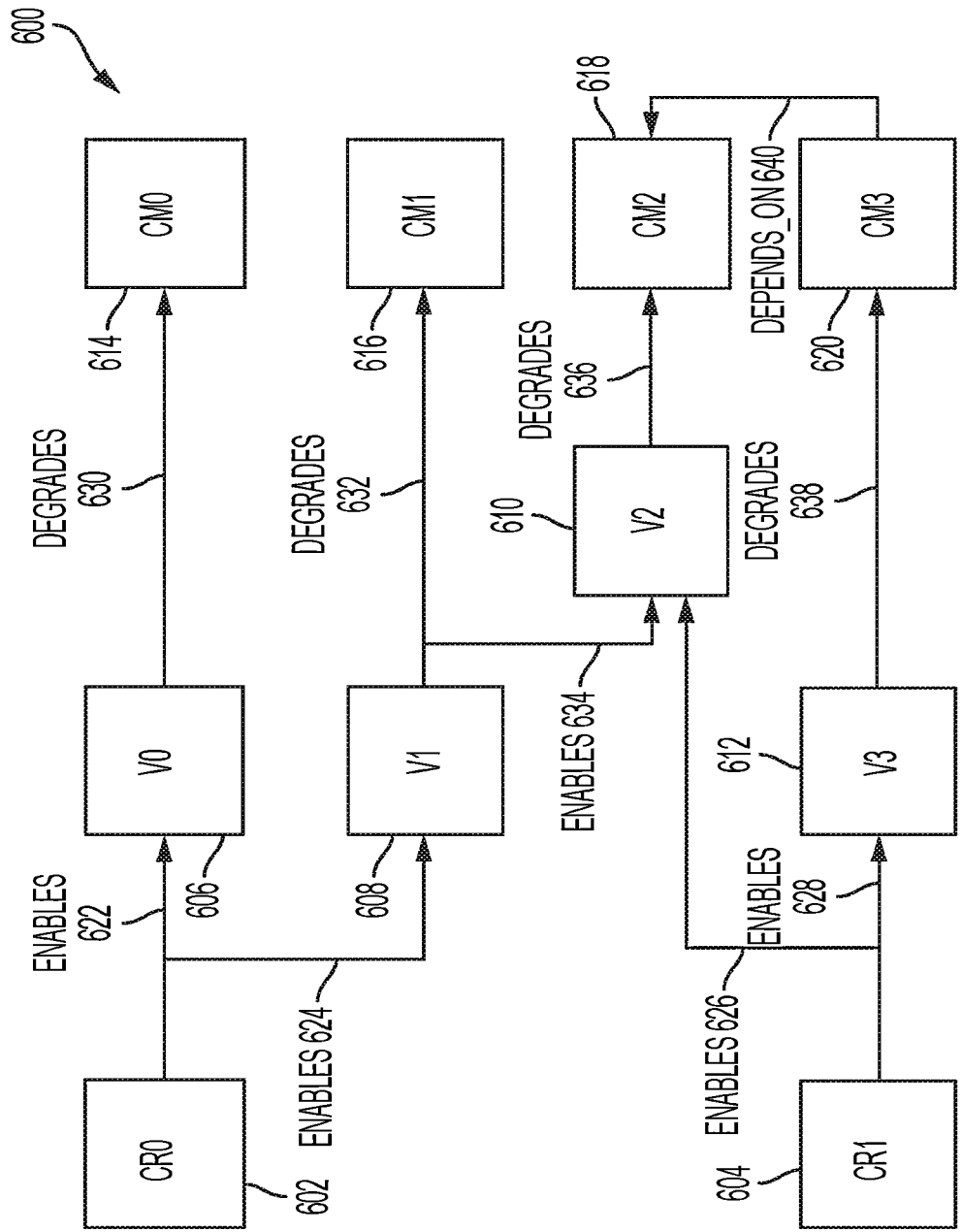
FIG. 6 depicts an exemplary graph model, including nodes which represent constraints, vulnerabilities, and components, in accordance with an embodiment of the present application.

FIG. 6 depicts an exemplary graph model 600, including nodes which represent constraints, vulnerabilities, and components, in accordance with an embodiment of the present application. In graph model 600, a constraint Cr0 602 enables (622) a vulnerability V0 606, which degrades (630) a component Cm0 614. Constraint Cr0 602 also enables (624) a vulnerability V1 608, which both degrades (632) a component Cm1 616 and enables (634) a vulnerability V2

610. Vulnerability V2 610 degrades (636) a component Cm2 618. A constraint Cr1 604 enables (626) vulnerability V2 610 and also enables (628) a vulnerability V3 612. Vulnerability V3 612 degrades (638) a component Cm3 620, which depends on (640) component Cm2 618.

Figure 7:
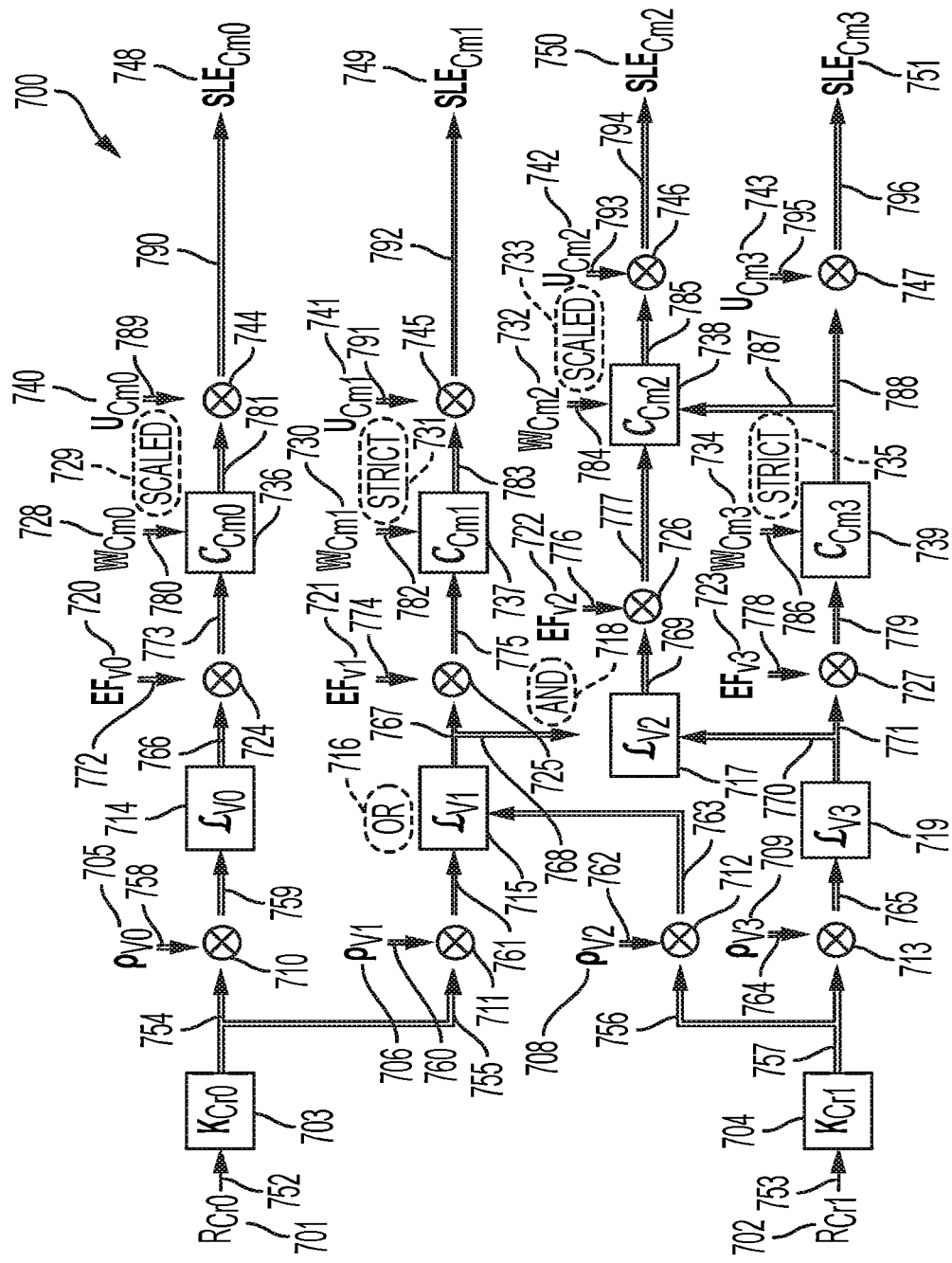
FIG. 7 depicts an exemplary operator representation corresponding to the graph model of FIG. 6, in accordance with an embodiment of the present application.

FIG. 7 depicts an exemplary operator representation 700 corresponding to the graph model of FIG. 6, in accordance with an embodiment of the present application. Relaxation values on constraints are indicated as $R_{Cr0}$ 701 and $R_{Cr1}$ 702. The corresponding normalization factors are indicated as $K_{Cr0}$ 703 and $K_{Cr1}$ 704. Exploitability or probability vectors or matrices for the vulnerabilities are indicated as $\rho_{V0}$ 705, $\rho_{V1}$ 706, $\rho_{V1}$ 708, and $\rho_{V3}$ 709. Note that $\rho_{V1}$ 706 and $\rho_{V1}$ 708 are the same value, because the exploitability value depends only on the Logic operator $\mathcal{L}_{V1}$ 715. Logic operators (which indicate how to combine multiple inputs into a vulnerability) are indicated as $\mathcal{L}_{V0}$ 714, $\mathcal{L}_{V1}$ 715 (defined as an "OR" 716 Logic operator), $\mathcal{L}_{V2}$ 717 (defined as an "AND" 718 Logic operator), and $\mathcal{L}_{V3}$ 719. Exposure factors associated with a vulnerability which degrade a component are indicated as $EF_{V0}$ 720, $EF_{V1}$ 721, $EF_{V2}$ 722, and $EF_{V3}$ 723. Combiner operators (which indicate how to combine multiple inputs into a component) are indicated as $\mathcal{C}_{Cm0}$ 736, $\mathcal{C}_{Cm1}$ 737, $\mathcal{C}_{Cm2}$ 738, and $\mathcal{C}_{Cm3}$ 739. The weight matrices W (which indicate how to weight the various dependency inputs by the Combiner operator) are indicated by $\mathbb{W}_{Cm0}$ 728 (defined as a scaled 729 dependency), $\mathbb{W}_{Cm1}$ 730 (defined as a strict 731 dependency), $\mathbb{W}_{Cm2}$ 732 (defined as a scaled 733 dependency), and $\mathbb{W}_{Cm3}$ 734 (defined as a strict 735 dependency). The utilities are indicated as $U_{Cm0}$ 740, $U_{Cm1}$ 741, $U_{Cm2}$ 742, and $U_{Cm3}$ 743. The symbol ⊗ can be referred to as a "circled times" operation and can be the matrix product with an implicit transpose of the left matrix, e.g., elements 710-713, 724-727, and 744-747.

Operator representation 700 (of FIG. 7) depicts an application to graph model 600 (of FIG. 6) of the math operator approach indicated in diagram 500 (of FIG. 5A). In the below description, the elements indicated in parentheses indicate the flow of calculated data through operator representation 700. A relaxation value $R_{Cr0}$ 701 provides input (via 752) to normalization $K_{Cr0}$ 703, which value (754) is circled times (710) with $\rho_{V0}$ 705 (758). The resulting value (759) is then input (as a single value) into Logic operator $\mathcal{L}_{V0}$ 714 (759), which result is passed through (766) and circled times (724) with $EF_{V0}$ 720 (772). The resulting value (773) is then used as a first input (773) to Combiner operator $\mathcal{C}_{Cm0}$ 736, where the second input (780) is $\mathbb{W}_{Cm0}$ 728. Using the calculations for a scaled 729 dependency, $\mathcal{C}_{Cm0}$ 736 can output a result (781), which is circled times (744) with the $U_{Cm0}$ 740 (789), which provides a result (790) that is the single loss expectancy for Component Cm0 (indicated as $SLE_{Cm0}$ 748).

Relaxation value $R_{Cr0}$ 701 also provides input (via 752) to normalization $K_{Cr0}$ 703, which value (755) is circled times (711) with psi 706 (760). The resulting value is then used as a first input (761) into Logic operator $\mathcal{L}_{V1}$ 715 (761), where the second input (763) is the result of a circled times 712 (described below). Logic operator $\mathcal{L}_{V1}$ 715 performs the OR 716 logic operation to obtain a result (767, 768). The resulting value (768) is passed to $\mathcal{L}_{V2}$ 717 (768, as described below). That same resulting value (767) is also circled times (725) with $EF_{V1}$ 721 (774), which resulting value (775) is then used as a first input (775) to Combiner operator $\mathcal{C}_{Cm1}$ 737, where the second input (782) is $\mathbb{W}_{Cm1}$ 730. Using the calculations for a strict 731 dependency, $\mathcal{C}_{Cm1}$ 737 can output a result (783), which is circled times (745) with $U_{Cm1}$ 741 (791), which provides a result (792) that is the single loss expectancy for Component Cm1 (indicated as $SLE_{Cm1}$ 749).

Relaxation value $R_{Cr1}$ 702 provides input (via 753) to normalization $K_{Cr1}$ 704, which value (756) is circled times (712) with $\rho_{V1}$ 708 (762). The resulting value (763) is then used as the second input (763) into OR 716 Logic operator $\mathcal{L}_{V1}$ 715 (763), (as described above).

Relaxation value $R_{Cr1}$ 702 also provides input (via 753) to normalization $K_{Cr1}$ 704, which value (757) is circled times (713) with $\rho_{V3}$ 709 (764). The resulting value (765) is then input (as a single value) into Logic operator $\mathcal{L}_{V3}$ 719 (765), which result is passed both as a first input (770) to $\mathcal{L}_{V2}$ 717 and also as a result (771), which is circled times (727) with $EF_{V3}$ 723 (778) to obtain a result (779). That result (779) is passed as a first input to Combiner operator $\mathcal{C}_{Cm3}$ 739 (779), where the second input (786) is $\mathbb{W}_{Cm3}$ 734. Using the calculations for a strict 735 dependency, $\mathcal{C}_{Cm3}$ 739 can output a result (787, 788). Because component Cm2 depends on component Cm3, the resulting value (787) is passed to $\mathcal{C}_{Cm2}$ 738 (787) and also used as a result (788) which is circled times (747) with $U_{Cm3}$ 743 (795), which provides a result (796) that is the single loss expectancy for Component Cm3 (indicated as $SLE_{Cm3}$ 751).

Since vulnerability v1 enables vulnerability v2, Logic operator $\mathcal{L}_{V2}$ 717 takes as a first input the result of $\mathcal{L}_{V1}$ 715 (768) and takes as a second input the result of $\mathcal{L}_{V3}$ 719 (770), performs the AND 718 logic operation to obtain a result (769). In this example, $\mathcal{L}_{V2}$ 717 has unity exploitability. That is, we did not use a $\rho_{V2}$ on edges 768 and 770. That result (769) is circled times (726) with $EF_{V2}$ 722 (776), which result (777) is passed as one of multiple inputs to Combiner operator $\mathcal{C}_{Cm2}$ 738. The other inputs to $\mathcal{C}_{Cm2}$ 738 include $\mathbb{W}_{Cm2}$ 732 (784) and the result of $\mathcal{C}_{Cm3}$ 739 (787, as described above). Using the calculations for a scaled 733 dependency, $C_{Cm2}$ 738 can output a result (785), which is circled times (746) with $U_{Cm2}$ 742 (793), which provides a result (794) that is the single loss expectancy for Component Cm2 (indicated as $SLE_{Cm2}$ 750).

Note that in operator representation 700, $\mathcal{L}_{V0}$ 714 and $\mathcal{L}_{V3}$ 719 both only have a single input, while $\mathcal{L}_{V1}$ uses the OR 716 logic and $\mathcal{L}_{V2}$ 717 uses the AND 718 logic to process, handle, or combine the multiple inputs. Furthermore, Combiner operator $\mathcal{C}_{Cm2}$ 738 takes, processes, handles, or combines multiple inputs, including a vulnerability chain (via 777) and a dependency upon another component (via 787). The final circled times operation prior to obtaining the single loss expectancy result for each component includes multiplying by the utility U to obtain the loss. The system can sum all of the individually obtained SLEs to determine a total utility given a particular combination of constraint relaxations and corresponding values. The sum can be an aggregation based on any method of combining multiple values of a similar dimension, e.g., a dot product.

Figure 8A:
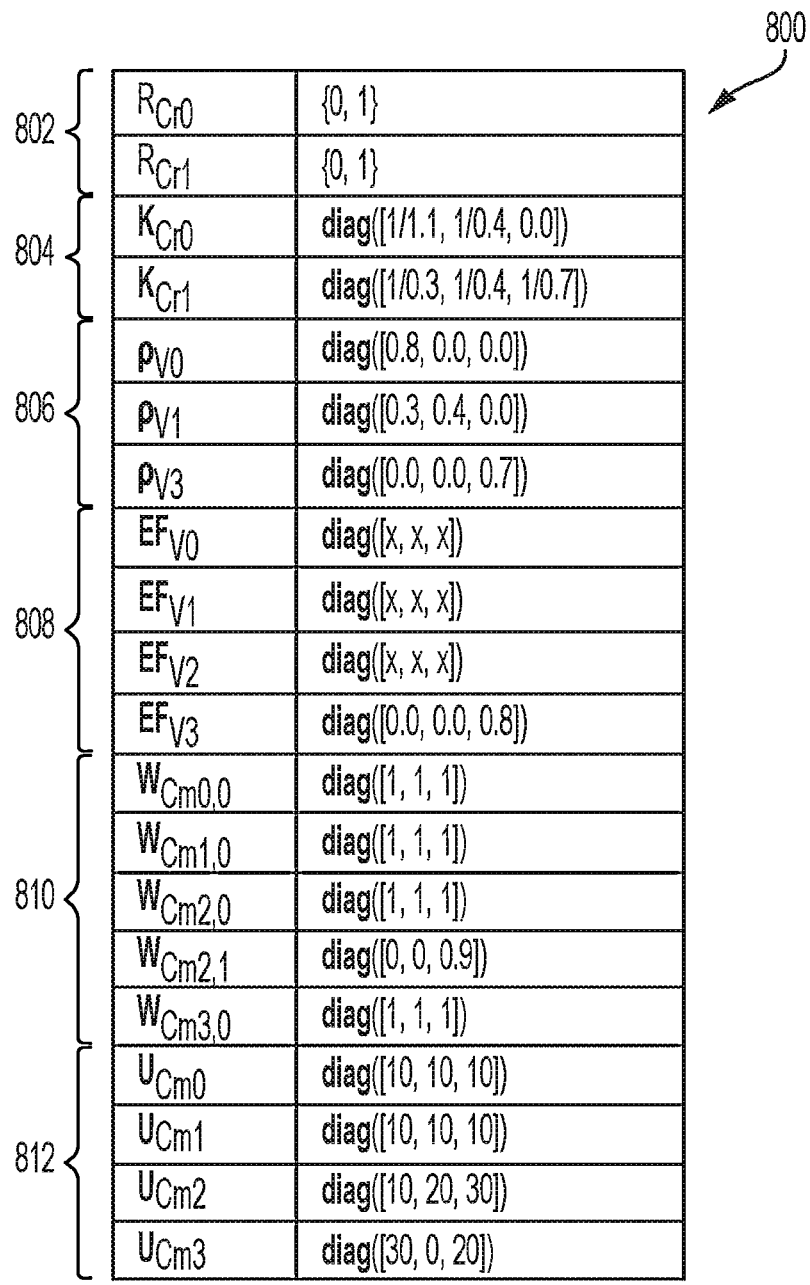
FIG. 8A illustrates a table with exemplary values for the nodes depicted in FIG. 7, in accordance with an embodiment of the present application.

FIG. 8A illustrates a table 800 with exemplary values for the nodes depicted in FIG. 7, in accordance with an embodiment of the present application. Table 800 includes: entries 802 which indicate that the relaxation value for each of the two depicted constraints Cr0 and Cr1 can have a value of 0 or 1, e.g., on/off values; entries 804 which indicate normalization factors for the two depicted constraints; entries 806 which indicate values for the probability of exploitation of the vulnerabilities; entries 808 which indicate values for the exposure factors associated with a vulnerability which degrades a connected component (indicated as x values in some cases for the purpose of illustration); entries 810 which indicate values for the weights of dependencies between components; and entries 812 which indicate the utility of components which may be affected by the exploitation of a vulnerability directly or indirectly (e.g., via a dependent component).

FIG. 8B illustrates a table 820 with exemplary values of inputs and resulting outputs of the operator representation depicted in FIG. 7 and based on the values in FIG. 8A, in accordance with an embodiment of the present application. Table 820 includes input columns 830, which can include: a column $R_{Cr0}$ 832 for the possible relaxation values of constraint Cr0; and a column $R_{Cr1}$ 834 for the possible relaxation values of constraint Cr1. Table 820 can also include output columns 840, which can include columns for each of the possible single loss expectancy (SLE) values for each of the four components: a column $SLE_{Cm0}$ 842; a column $SLE_{Cm1}$ 844; a column $SLE_{Cm2}$ 846; and a column $SLE_{Cm3}$ 848.

An entry 852 indicates that if both relaxation constraints Cr0 and Cr1 are set to 0 (i.e., not relaxed), then the SLE for all four components is [0, 0, 0]. An entry 854 indicates that if constraint Cr0 is relaxed but Cr1 is not relaxed, the SLE across the multiple dimensions (e.g., [C, I, A]) for component Cm0 can be [7.27, 0, 0], for component Cm1 can be [10, 10, 0], and for components Cm2 and Cm3 can be [0, 0, 0]. An entry 856 indicates that if constraint Cr0 is not relaxed but Cr1 is relaxed, $SLE_{Cm0}$ can have a value of [0, 0, 0], $SLE_{Cm1}$ can have a value of [10, 10, 0], $SLE_{Cm2}$ can have a value of [0, 0, 27], and $SLE_{Cm3}$ can have a value of [0, 0, 20]. An entry 858 indicates that if both constraints Cr0 and Cr1 are set to 1 (i.e., relaxed), $SLE_{Cm0}$ can have a value of [7.27, 0, 0], $SLE_{Cm1}$ can have a value of [10, 10, 0], $SLE_{Cm2}$ can have a value of [0, 0, 27], and $SLE_{Cm3}$ can have a value of [0, 0, 20].

Figure 9:
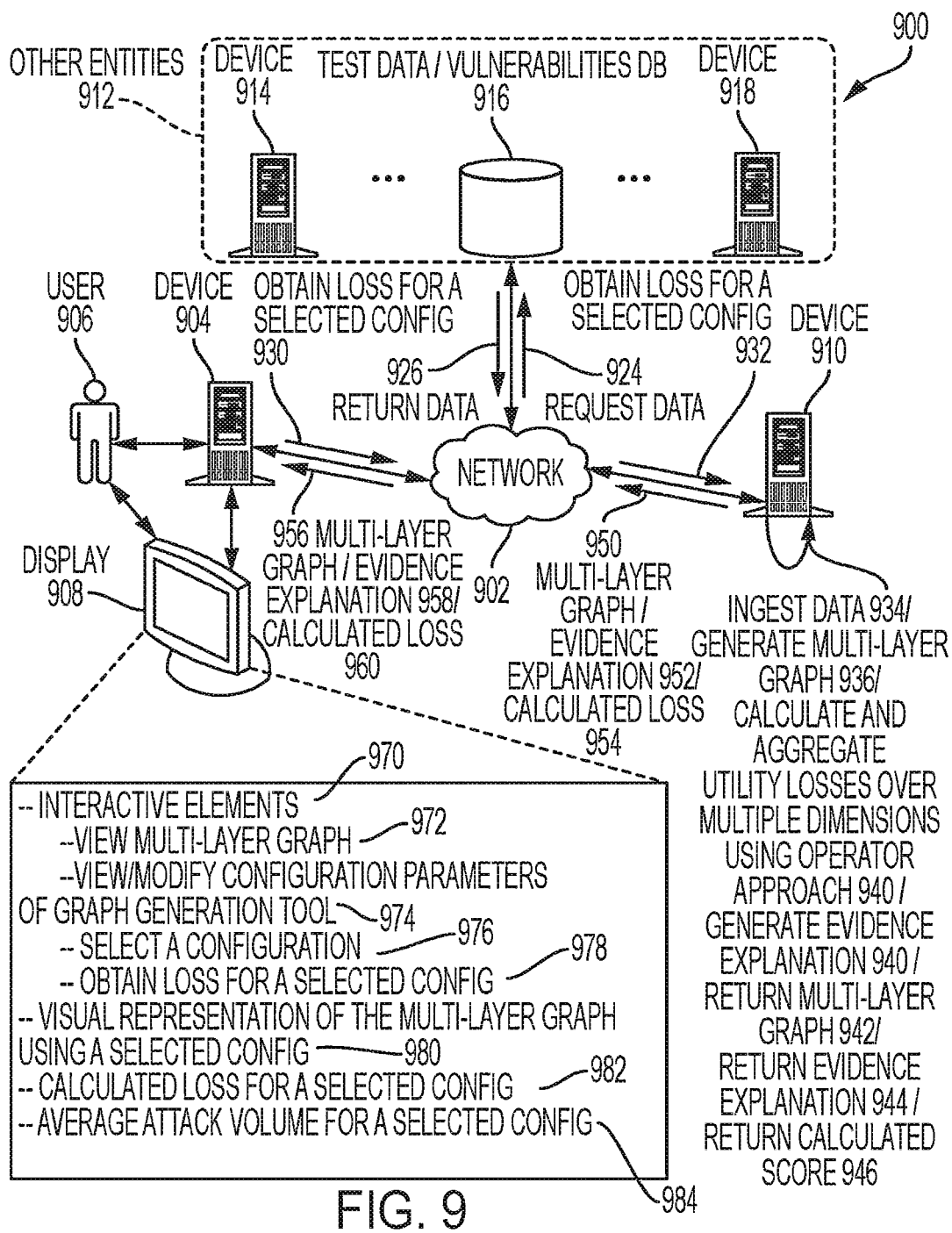
FIG. 9 depicts an exemplary environment for calculating multi-dimensional metrics through a system of dependencies, in accordance with an embodiment of the present application.

Exemplary Environment for Calculating Multi-Dimensional Metrics Through a System of Dependencies FIG. 9 depicts an exemplary environment 900 for calculating multi-dimensional metrics through a system of dependencies, in accordance with an embodiment of the present application. Environment 900 can include: a device 904, an associated user 906, and an associated display 908; other entities 912; and a device 910. Other entities 912 can include a plurality of devices and data stored in the plurality of devices, e.g., devices 914 and 918 (which can include associated storage devices, not shown) and a test data/vulnerability database 916 (e.g., National Vulnerability Database or NVD). Other entities 912 can also include IoT search engines, such as Shodan (not shown) and other public or proprietary databases. Device 904, other entities 912, and device 918 can communicate with each other via a network 902. Vulnerability database 916 can include vulnerabilities which are organized based on a category of vulnerability, and can also include selected known vulnerabilities (not shown). Devices 904 and 910 can be a server, a computing device, or any device which can perform the functions described herein.

During operation, device 904 can receive information obtained from other entities 912 and ingested by device 910 (e.g., by the data ingestion framework or another device or component). Device 910 can determine information sources from which to retrieve data, request the data from the information sources (via a request data 924 communication), and receive the requested data (via a return data 926 communication). Upon receiving the requested data (not shown), device 910 can ingest the data, normalize the ingested data, and extract information from the ingested data (operation 934).

In some embodiments, user 906 can select an interactive element on display 908, which corresponds to a command to generate the multi-layer graph (not shown) or obtain the loss for a selected configuration with certain configuration parameters (elements 976 and 978). For example, via element 978, user 906 can send a command to obtain the loss for a selected configuration 930. The selected configuration can include on/off values for constraints, i.e., relaxation constraint values of 0 or 1 for each constraint as described above in relation to FIGS. 5A, 5B, 6, and 7. Device 910 can receive this command (as a command to obtain the loss for a selected configuration 932). Device 910 can generate the multi-layer graph (operation 936), based on the selected configuration, and can thus determine the multi-layer graph, which can include all the nodes, directed edges, likelihoods/probabilities, and exposure factors as described herein.

Specifically, the multi-layer graph can include a configuration subgraph, a vulnerability subgraph, and a dependency subgraph. The vulnerability subgraph can include vulnerability nodes which represent known vulnerabilities to the system. The dependency subgraph can include dependency nodes which represent components in the system. Direct dependency nodes can each be associated with an exposure factor which indicates an amount of degradation caused to a respective component based on exploitation of a respective vulnerability which directly degrades the respective component. Indirect dependency nodes can each be associated with a respective dependency function which indicates a level of dependency of a respective indirect dependency node upon a dependency node reachable by a directed edge from the respective indirect dependency node to the dependency node. Thus, device 910 can determine, among other nodes, vulnerability nodes and dependency nodes (operation 938).

Device 918 can calculate, for all components in the system, a loss of utility of each given dimension of multiple dimensions, by using a Logic operator and a Combiner operator as described in the math operator approach of FIG. 7 (operation 940). Device 918 can generate an evidence explanation for the calculated score (not shown) and can return to device 904 any or all of the multi-layer graph, the evidence explanation, and the calculated loss (respectively, operations 942, 944, and 946) as a multi-layer graph 950, an evidence explanation 952, and a calculated loss 954.

Device 904 can receive multi-layer graph 950, evidence explanation 952, and calculated loss 954 (as a multi-layer graph 956, an evidence explanation 958, and a calculated loss 960) and can display on the screen of display 908 interactive elements 970 including at least: a view of the multi-layer graph (similar to element 972); the calculated loss for a selected configuration (element 982); and an evidence generation explanation (element 984). Calculated loss 982 or evidence generation explanation 984 can include, e.g.: values used as relaxation constraints; probability values; exposure factors; weights; any interim or final results of any of the calculations described in relation to FIG. 7, including associated with the Logic operator and the Combiner operator; one or more of the equations, algorithms, operators, or approaches used to calculate the loss; a description of how a particular dimension was affected by the relaxation of a constraint or the exploitation of a vulnerability; individual loss utilities; an aggregation of the calculated losses of utility; and any information as described herein and above in relation to FIGS. 5A, 5B, 6, and 7.

Using an interactive element on display 908, user 906 can select a configuration (element 976) or modify configuration parameters of the system to obtain an updated configuration (not shown) or modify configuration parameters of a graph generation tool (element 974). User 906 can send another command to obtain the calculated loss for the selected or updated configuration (similar to command 930), and the operation can repeat as described above.

Thus, environment 900 depicts how user 906 can interact with the system to view, obtain, and modify configurations based on the calculated loss. The system can provide an optimal configuration based on user- or system-configured constraints and parameters. User 906 (or the overall system) can select an optimal configuration which prioritizes at least one of a security priority or an operational priority or which minimizes the loss of the overall system or the loss of one or more components in the system.

Figure 10A:
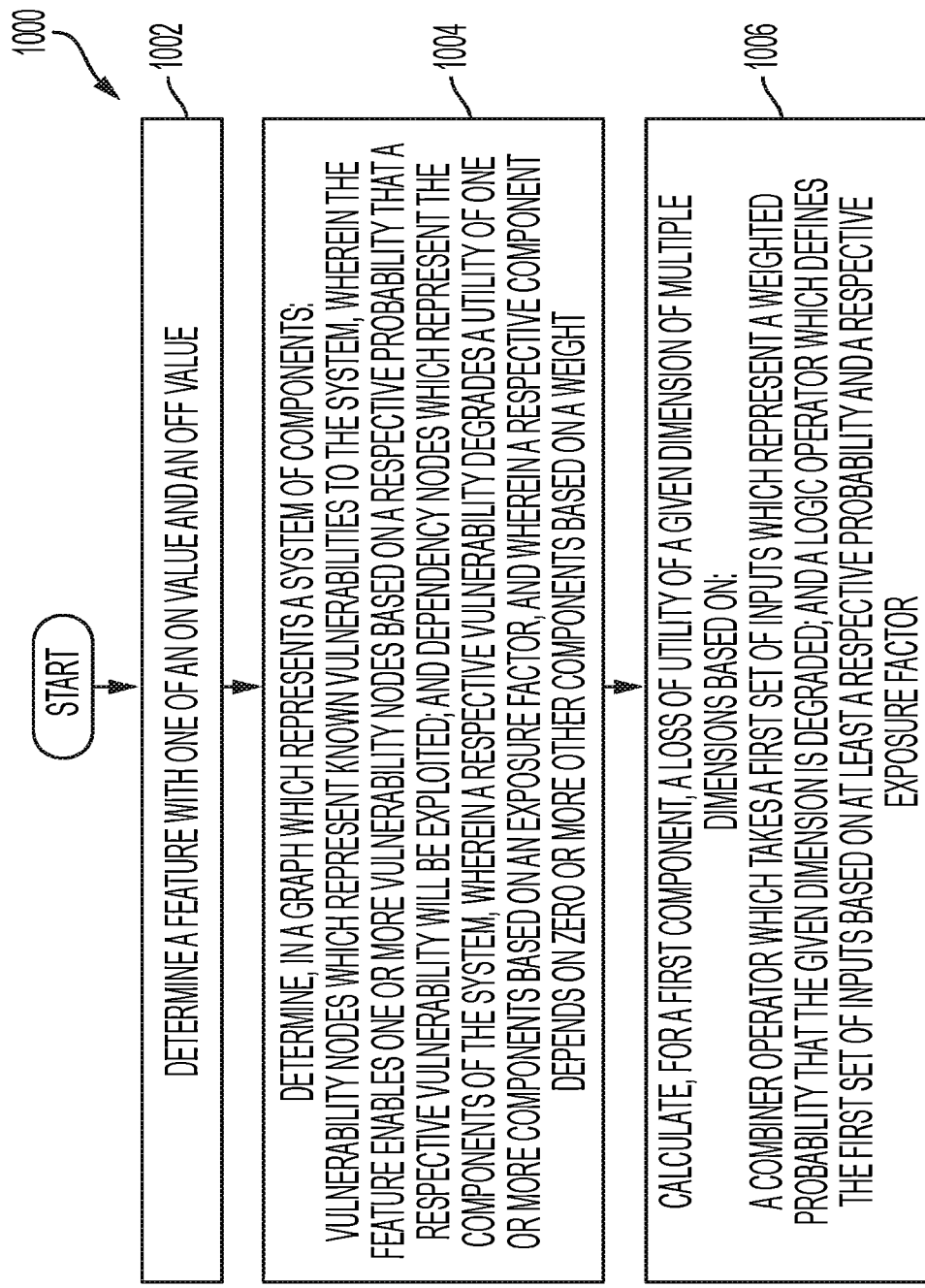

Method for Calculating Multi-Dimensional Metrics Through a System of Dependencies FIG. 10A and FIG. 10B present a flowchart 1000 illustrating a method for calculating multi-dimensional metrics through a system of dependencies, in accordance with an embodiment of the present application. During operation, the system determines a feature with one of an on value and an off value (operation 1002). The system determines, in a graph which represents a system of components: vulnerability nodes which represent known vulnerabilities to the system, wherein the feature enables one or more vulnerability nodes based on a respective probability that a respective vulnerability will be exploited; and dependency nodes which represent the components of the system, wherein a respective vulnerability degrades a utility of one or more components based on an exposure factor, and wherein a respective component depends on zero or more other components based on a weight (operation 1004).

The system calculates, for a first component, a loss of utility of a given dimension of multiple dimensions based on: a combiner operator which takes a first set of inputs which represent a weighted probability that the given dimension is degraded; and a logic operator which defines the first set of inputs based on at least a respective probability and a respective exposure factor (operation 1006). The system aggregates calculated losses of utility for the components of the system for each combination of possible on/off values for one or more features, wherein a respective calculated loss of utility corresponds to a respective dimension of the multiple dimensions (operation 1008). The system selects a first combination of the possible on/off values for the one or more features which results in a lowest loss of utility for the components (operation 1010).

Integration into a Practical Application and Improvements to Technologies

The embodiments described herein can be integrated into a practical application for, and can result in an improvement in, several technologies and technical fields, including but not limited to cybersystem security, protection and configuration of distributed systems, optimization of system configurations, defense against potential security attacks, and quantification of a loss of utility across multiple dimensions of a component in a system of dependencies.

Users of the system described herein can include an individual with a smartphone, a mobile device, or a computing terminal (e.g., user 906 of environment 900 of FIG. 9). Users of the system can also include any client in a cybersystem security setting, where determining and optimizing the configuration of a system against attacks can provide a more secure system. The technological improvements described herein (e.g., calculating the propagation of the security impact across multiple dimensions and using an operator methodology to determine the loss of utility in the overall system) provide a system which can discriminate between systems based on the relaxation of constraints and by accounting for information about dependencies among components. These technological improvements can thus account for cascading failures due to the interdependencies among vulnerabilities, components, and configurations. For example, the graph model and corresponding operator representation of described above in relation to FIGS. 6 and 7, along with the table in FIG. 8B, support the technological improvements of the described embodiments by depicting how the operator methodology can provide the single loss expectancy for each component based on various possible combinations of on/off values for the constraint feature.

Furthermore, the described embodiments provide an improvement to technology because the system allows a user to interact with the calculated losses and corresponding configurations (as shown in the exemplary information displayed in display 908 of FIG. 9). The system can result in facilitating the use of the calculated losses over multiple dimensions by using the operator methodology as described herein to determine optimal configurations of the distributed system.

Figure 11:
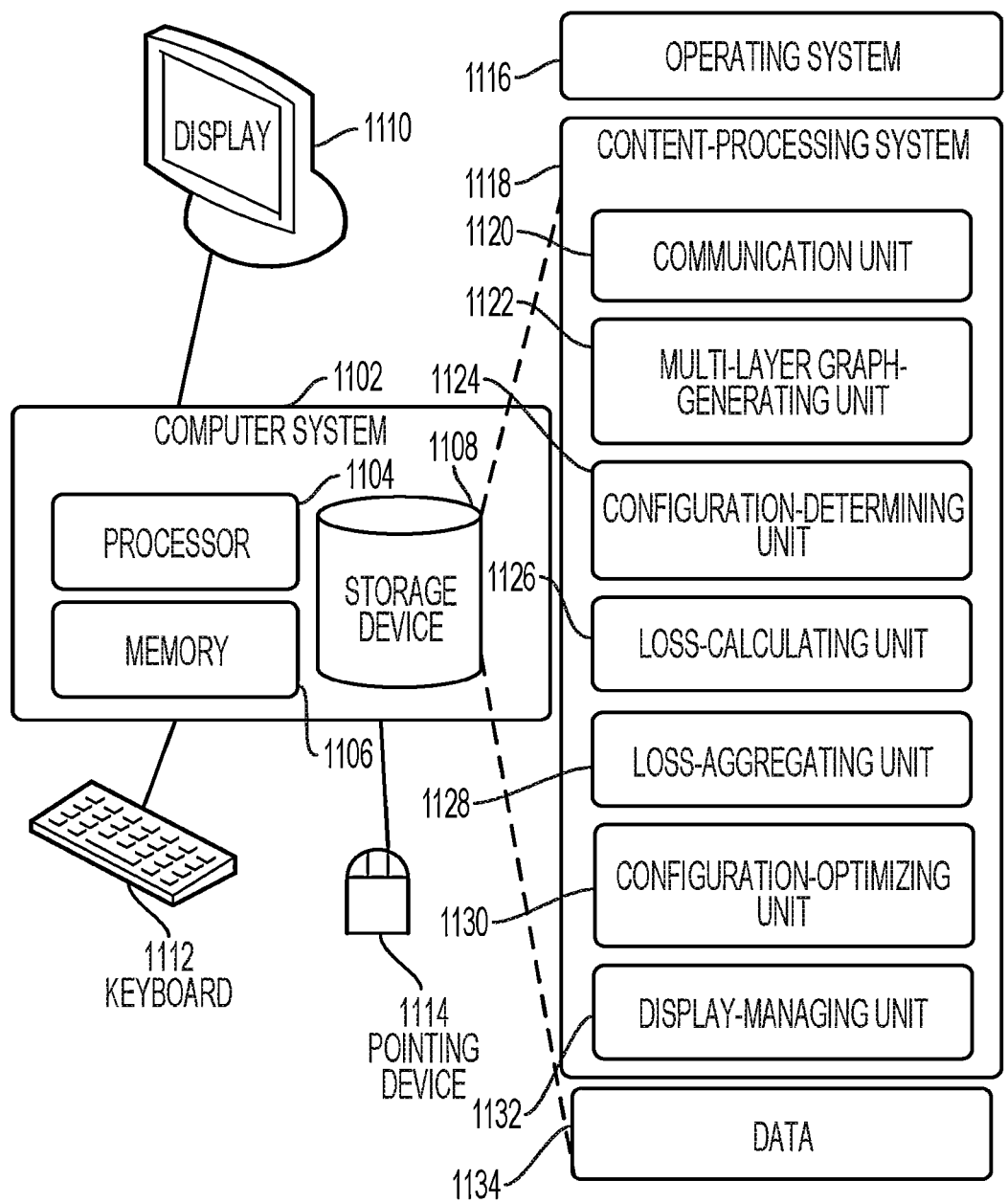
FIG. 11 presents an exemplary computer and communication system which facilitates calculating multi-dimensional metrics through a system of dependencies, in accordance with an embodiment of the present application.

Computer and Communication System which Facilitates Calculating Multi-Dimensional Metrics Through a System of Dependencies FIG. 11 presents an exemplary computer and communication system 1102 which facilitates calculating multi-dimensional metrics through a system of dependencies, in accordance with an embodiment of the present application. Computer system 1102 includes a processor 1104, a memory 1106, and a storage device 1108. Memory 1106 can include a volatile memory (e.g., RAM) that serves as a managed memory, and can be used to store one or more memory pools. Furthermore, computer system 1102 can be coupled to a display device 1110, a keyboard 1112, and a pointing device 1114. Storage device 1108 can store an operating system 1116, a content-processing system 1118, and data 1134.

Content-processing system 1118 can include instructions, which when executed by computer system 1102, can cause computer system 1102 to perform methods and/or processes described in this disclosure. Specifically, content-processing system 1118 may include instructions for sending and/or receiving data packets to/from other network nodes across a computer network (communication unit 1120). A data packet can include data, a request, a command, a single loss expectancy or loss-related information, a configuration, and graph-related information.

Content-processing system 1118 can further include instructions for determining a feature with one of an on value and an off value (configuration-determining unit 1124). Content-processing system 1118 can include instructions for determining, in a graph which represents a system of components: vulnerability nodes which represent known vulnerabilities to the system, wherein the feature enables one or more vulnerability nodes based on a respective probability that a respective vulnerability will be exploited;

and dependency nodes which represent the components of the system, wherein a respective vulnerability degrades a utility of one or more components based on an exposure factor, and wherein a respective component depends on zero or more other components based on a weight (multi-layer graph-generating unit 1122). Content-processing system 1118 can include instructions for calculating, for a path in the graph to a first component, a loss of utility of a given dimension of multiple dimensions based on: a combiner operator which takes a first set of inputs which represent a weighted probability that the given dimension is degraded; and a logic operator which defines the first set of inputs based on at least a respective probability and a respective exposure factor (loss-calculating unit 1126). Content-processing system 1118 can include instructions for aggregating calculated losses of utility for the components of the system for each combination of possible on/off values for one or more features, wherein a respective calculated loss of utility corresponds to a respective dimension of the multiple dimensions (loss-aggregating unit 1128). Content-processing system 1118 can include instructions for selecting a first combination of the possible on/off values for the one or more features which results in a lowest loss of utility for the components (configuration-optimizing unit 1130).

Content-processing system 1118 can additionally include instructions for applying an updated configuration for the system based on the calculated loss of utility for the first component or the aggregated calculated losses of utility for the components of the system, wherein the updated configuration is based on the selected first combination of possible on/off values (configuration-optimizing unit 1130). Content-processing system 1118 can include instructions for displaying, on a screen of a user device, one or more interactive elements which allow the user to view, obtain, or select information as described herein and in relation to FIG. 9 (display-managing unit 1132).

Data 1134 can include any data that is required as input or that is generated as output by the methods and/or processes described in this disclosure. Specifically, data 1134 can store at least: a graph; a multi-layer graph; subgraphs; a configuration subgraph; a vulnerability or attack subgraph; a dependency subgraph; nodes; vertices; directed edges; vulnerability nodes; dependency nodes; configuration nodes; a likelihood; an exploitation likelihood or a probability that a vulnerability will be exploited; an exposure factor; a summation; an indication of an on/off value for a feature; a weight; a weighted probability; a weight summation; an aggregation; summation; a utility of a component; a loss of utility; an indicator of a path or a node in a graph; a dimension or metric; multiple dimensions or metrics; a confidentiality, integrity, or availability dimension or metric; aggregated losses of utility for components in a system; a combination of possible on/off values for one or more features; a lowest loss of utility; a constraint; a configuration; a limitation on a configurable parameter for a component; a known vulnerability; a CVE; a non-CVE; a predefined bad or best practice; a scaled, strict, or redundant dependency; a set of inputs; an amount of degradation or impact to a component or vulnerability based on dependencies in the system or graph; a direct vulnerability; an indirect vulnerability; a direct dependency; a logic operator; a combiner operator; and an updated or selected configuration.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware units or apparatus. The hardware units or apparatus can include, but are not limited to, application-specific integrated circuit (ASIC) chips, field-programmable gate arrays (FPGAs), dedicated or shared processors that execute a particular software component or a piece of code at a particular time, and other programmable-logic devices now known or later developed. When the hardware units or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method, comprising:
   determining a feature with one of an on value and an off value;
   determining, in a graph which represents a system of components:
      vulnerability nodes which represent known vulnerabilities to the system, wherein the feature enables one or more vulnerability nodes based on a respective probability that a respective vulnerability will be exploited; and
      dependency nodes which represent the components of the system, wherein a respective vulnerability degrades a utility of one or more components based on an exposure factor, and wherein a respective component depends on zero or more other components based on a weight;
   calculating, for a path in the graph to a first component, a loss of utility of a given dimension of multiple dimensions based on:
      a combiner operator which takes a first set of inputs which represent a weighted probability that the given dimension is degraded; and
      a logic operator which defines the first set of inputs based on at least a respective probability and a respective exposure factor;
   aggregating calculated losses of utility for the components of the system for each combination of possible on/off values for one or more features, wherein a respective calculated loss of utility corresponds to a respective dimension of the multiple dimensions; and
   selecting a first combination of the possible on/off values for the one or more features which results in a lowest loss of utility for the components.

2. The method of claim 1,
wherein the feature comprises a constraint, wherein the one or more features comprise one or more constraints, and wherein the constraint is one of the one or more constraints, and
wherein the constraint is related to a limitation on a configurable parameter for a component of the system of the components.

3. The method of claim 1, wherein the known vulnerabilities represented by the vulnerability nodes are based on at least one of:
common vulnerabilities and exposures (CVE) based on a national vulnerability database (NVD);
non-CVE vulnerabilities; and
a predefined bad practice or best practice.

4. The method of claim 1, wherein a dependency between the respective component and a first component upon which the respective component depends is associated with at least one of:
a scaled dependency, in which the respective component degrades in a proportion to how the first component is impacted;
a strict dependency, in which the respective component degrades completely based on how the first component is impacted;
a redundant dependency, in which the respective component degrades if the first component and other components in a redundant pool of resources are impacted; and
a proportional dependency, in which the respective component degrades by a fixed factor if a first component is impacted.

5. The method of claim 1, wherein the multiple dimensions include at least one of:
a confidentiality dimension;
an integrity dimension; and
an availability dimension.

6. The method of claim 1,
wherein the combiner operator determines how the first set of inputs combine to degrade a utility of a given dependency node.

7. The method of claim 1, wherein the weighted probability represented by the first set of inputs comprises:
for a direct vulnerability in the path, the respective probability and the respective exposure factor; and
for an indirect vulnerability or a direct dependency in the path, the respective probability, the respective exposure factor, and results of a combiner operator for a prior dependency in the path.

8. The method of claim 1,
wherein the logic operator determines how a second set of inputs affect the respective exposure factor of a given vulnerability node, and
wherein the second set of inputs comprises a result of the logic operator on one or more respective probabilities.

9. The method of claim 1, further comprising:
applying an updated configuration for the system based on the calculated loss of utility for the first component or the aggregated calculated losses of utility for the components of the system,
wherein the updated configuration is based on the selected first combination of possible on/off values.

10. The method of claim 1,
wherein the graph comprises a multi-layer graph which includes a configuration subgraph, a vulnerability subgraph, and a dependency subgraph,
wherein the vulnerability subgraph includes the vulnerability nodes, and
wherein the dependency subgraph includes the dependency nodes.

11. The method of claim 10, further comprising:
displaying, on a screen of a user device, one or more interactive elements which allow the user to:
view the multi-layer graph, including the vulnerability nodes, the dependency nodes, directed edges, likelihoods of exploitation associated with vulnerability nodes, exposure factors, weights, and dependency functions in any of the configuration subgraph, the vulnerability subgraph, and the dependency subgraph;
view or modify configuration parameters for the system using a graph generation tool to obtain the one or more configurations;
obtain a calculated loss of utility for any component represented in the multi-layer graph, including across the multiple dimensions;
view the calculated loss for the one or more configurations;
select a first configuration of the one or more configurations; and
view an explanation of evidence associated with the selected first configuration.

12. A computer system comprising:
a processor; and
a storage device storing instructions that when executed by the processor cause the processor to perform a method, the method comprising:
determining a feature with one of an on value and an off value;
determining, in a graph which represents a system of components:
vulnerability nodes which represent known vulnerabilities to the system, wherein the feature enables one or more vulnerability nodes based on a respective probability that a respective vulnerability will be exploited; and
dependency nodes which represent the components of the system, wherein a respective vulnerability degrades a utility of one or more components based on an exposure factor, and wherein a respective component depends on zero or more other components based on a weight;
calculating, for a path in the graph to a first component, a loss of utility of a given dimension of multiple dimensions based on:
a combiner operator which takes a first set of inputs which represent a weighted probability that the given dimension is degraded; and
a logic operator which defines the first set of inputs based on at least a respective probability and a respective exposure factor;
aggregating calculated losses of utility for the components of the system for each combination of possible on/off values for one or more features, wherein a respective calculated loss of utility corresponds to a respective dimension of the multiple dimensions; and
selecting a first combination of the possible on/off values for the one or more features which results in a lowest loss of utility for the components.

13. The computer system of claim 12, wherein the multiple dimensions include at least one of:
a confidentiality dimension;
an integrity dimension; and
an availability dimension.

14. The computer system of claim 12,
wherein the combiner operator determines how the first set of inputs combine to degrade a utility of a given dependency node, and
wherein the weighted probability represented by the first set of inputs comprises:
for a direct vulnerability in the path, the respective probability and the respective exposure factor; and
for an indirect vulnerability or a direct dependency in the path, the respective probability, the respective exposure factor, and results of a combiner operator for a prior dependency in the path.

15. The computer system of claim 12,
wherein the logic operator determines how a second set of inputs affect the respective exposure factor of a given vulnerability node, and
wherein the second set of inputs comprises a result of the logic operator on one or more respective probabilities.

16. The computer system of claim 12, wherein the method further comprises:
applying an updated configuration for the system based on the calculated loss of utility for the first component or the aggregated calculated losses of utility for the components of the system,
wherein the updated configuration is based on the selected first combination of possible on/off values.

17. The computer system of claim 12,
wherein the graph comprises a multi-layer graph which includes a configuration subgraph, a vulnerability subgraph, and a dependency subgraph,
wherein the vulnerability subgraph includes the vulnerability nodes, and
wherein the dependency subgraph includes the dependency nodes, and
wherein the method further comprises displaying, on a screen of a user device, one or more interactive elements which allow the user to:
view the multi-layer graph, including the vulnerability nodes, the dependency nodes, directed edges, likelihoods of exploitation associated with vulnerability nodes, exposure factors, weights, and dependency functions in any of the configuration subgraph, the vulnerability subgraph, and the dependency subgraph;
view or modify configuration parameters for the system using a graph generation tool to obtain the one or more configurations;
obtain a calculated loss of utility for any component represented in the multi-layer graph, including across the multiple dimensions;
view the calculated loss for the one or more configurations;
select a first configuration of the one or more configurations; and
view an explanation of evidence associated with the selected first configuration.

18. A non-transitory computer-readable storage medium storing instructions that when executed by a computer cause the computer to perform a method, the method comprising:
determining a feature with one of an on value and an off value;
determining, in a graph which represents a system of components:
vulnerability nodes which represent known vulnerabilities to the system, wherein the feature enables one or more vulnerability nodes based on a respective probability that a respective vulnerability will be exploited; and
dependency nodes which represent the components of the system, wherein a respective vulnerability degrades a utility of one or more components based on an exposure factor, and wherein a respective component depends on zero or more other components based on a weight;
calculating, for a path in the graph to a first component, a loss of utility of a given dimension of multiple dimensions based on:
a combiner operator which takes a first set of inputs which represent a weighted probability that the given dimension is degraded; and
a logic operator which defines the first set of inputs based on at least a respective probability and a respective exposure factor;
aggregating calculated losses of utility for the components of the system for each combination of possible on/off values for one or more features, wherein a respective calculated loss of utility corresponds to a respective dimension of the multiple dimensions; and
selecting a first combination of the possible on/off values for the one or more features which results in a lowest loss of utility for the components.

19. The storage medium of claim 18,
wherein the combiner operator determines how the first set of inputs combine to degrade a utility of a given dependency node,
wherein the weighted probability represented by the first set of inputs comprises:
for a direct vulnerability in the path, the respective probability and the respective exposure factor; and
for an indirect vulnerability or a direct dependency in the path, the respective probability, the respective exposure factor, and results of a combiner operator for a prior dependency in the path,
wherein the logic operator determines how a second set of inputs affect the respective exposure factor of a given vulnerability node, and
wherein the second set of inputs comprises a result of the logic operator on one or more respective probabilities.

20. The storage medium of claim 18, wherein the method further comprises:
applying an updated configuration for the system based on the calculated loss of utility for the first component or the aggregated calculated losses of utility for the components of the system,
wherein the updated configuration is based on the selected first combination of possible on/off values,
wherein the graph comprises a multi-layer graph which includes a configuration subgraph, a vulnerability subgraph, and a dependency subgraph,
wherein the vulnerability subgraph includes the vulnerability nodes, and
wherein the dependency subgraph includes the dependency nodes, and
wherein the method further comprises displaying, on a screen of a user device, one or more interactive elements which allow the user to:
view the multi-layer graph, including the vulnerability nodes, the dependency nodes, directed edges, likelihoods of exploitation associated with vulnerability nodes, exposure factors, weights, and dependency functions in any of the configuration subgraph, the vulnerability subgraph, and the dependency subgraph;

view or modify configuration parameters for the system using a graph generation tool to obtain the one or more configurations;

obtain a calculated loss of utility for any component represented in the multi-layer graph, including across the multiple dimensions;

view the calculated loss for the one or more configurations;

select a first configuration of the one or more configurations; and view an explanation of evidence associated with the selected first configuration.

* * * * *